United States Patent
Mann et al.

(10) Patent No.: US 12,519,099 B1
(45) Date of Patent: Jan. 6, 2026

(54) SOLID-STATE BATTERIES AND METHODS OF MAKING SOLID-STATE BATTERIES

(71) Applicants: Walter Roland Mann, Rancho Mission Viejo, CA (US); William David Dick, Minneapolis, MN (US); Richard G. Blair, Oviedo, FL (US)

(72) Inventors: Walter Roland Mann, Rancho Mission Viejo, CA (US); William David Dick, Minneapolis, MN (US); Richard G. Blair, Oviedo, FL (US)

(*) Notice: Subject to any disclaimer, the term of this patent is extended or adjusted under 35 U.S.C. 154(b) by 623 days.

(21) Appl. No.: 17/943,032

(22) Filed: Sep. 12, 2022

Related U.S. Application Data

(60) Provisional application No. 63/243,054, filed on Sep. 10, 2021.

(51) Int. Cl.

| | |
|---|---|
| *H01M 4/133* | (2010.01) |
| *H01M 4/02* | (2006.01) |
| *H01M 4/136* | (2010.01) |
| *H01M 4/58* | (2010.01) |
| *H01M 4/587* | (2010.01) |
| *H01M 4/62* | (2006.01) |

(Continued)

(52) U.S. Cl.
CPC .......... *H01M 4/133* (2013.01); *H01M 4/136* (2013.01); *H01M 4/5825* (2013.01); *H01M 4/587* (2013.01); *H01M 4/62* (2013.01); *H01M 4/622* (2013.01); *H01M 10/0404* (2013.01); *H01M 10/0562* (2013.01); *H01M 50/403* (2021.01); *H01M 50/431* (2021.01); *H01M 2004/021* (2013.01); *H01M 2004/027* (2013.01); *H01M 2004/028* (2013.01); *H01M 10/0525* (2013.01); *H01M 2300/0068* (2013.01); *H01M 2300/008* (2013.01)

(58) Field of Classification Search
CPC .... H01M 4/133; H01M 4/136; H01M 4/5825; H01M 4/587; H01M 4/62; H01M 4/622; H01M 10/0404; H01M 10/0562; H01M 10/0525; H01M 10/052; H01M 10/36; H01M 50/403; H01M 50/431; H01M 2004/021; H01M 2004/027; H01M 2004/028; H01M 2300/0068; H01M 2300/008
See application file for complete search history.

(56) References Cited

U.S. PATENT DOCUMENTS

2018/0138554 A1* 5/2018 Mukherjee .......... H01M 10/054

* cited by examiner

*Primary Examiner* — Eugenia Wang
(74) *Attorney, Agent, or Firm* — Camuti Law Group APC; Nathan Camuti

(57) ABSTRACT

Described herein are examples of solid-state batteries. The solid-state battery can include a cathode prepared from graphene, sulfur and phosphorus, an anode prepared from silicon and lithium, and a separator prepared from an ion-conducting material. The solid-state battery can further include current collectors and housings to prepare the solid-state battery. The main elements (cathode, separator, and anode) can be selectively blended together to avoid the problems of a hard interface and to provide more efficient performance. The method of building the battery can be instrumental in simplifying the manufacturing process in next-generation factories. The solid-state batteries can be prepared without liquid electrolytes by substituting solid electrolyte particles into the electrode material itself, or by other means, resulting in safer, smaller and easier to manufacture batteries.

6 Claims, 13 Drawing Sheets

(51) Int. Cl.
*H01M 10/04* (2006.01)
*H01M 10/0525* (2010.01)
*H01M 10/0562* (2010.01)
*H01M 50/403* (2021.01)
*H01M 50/431* (2021.01)

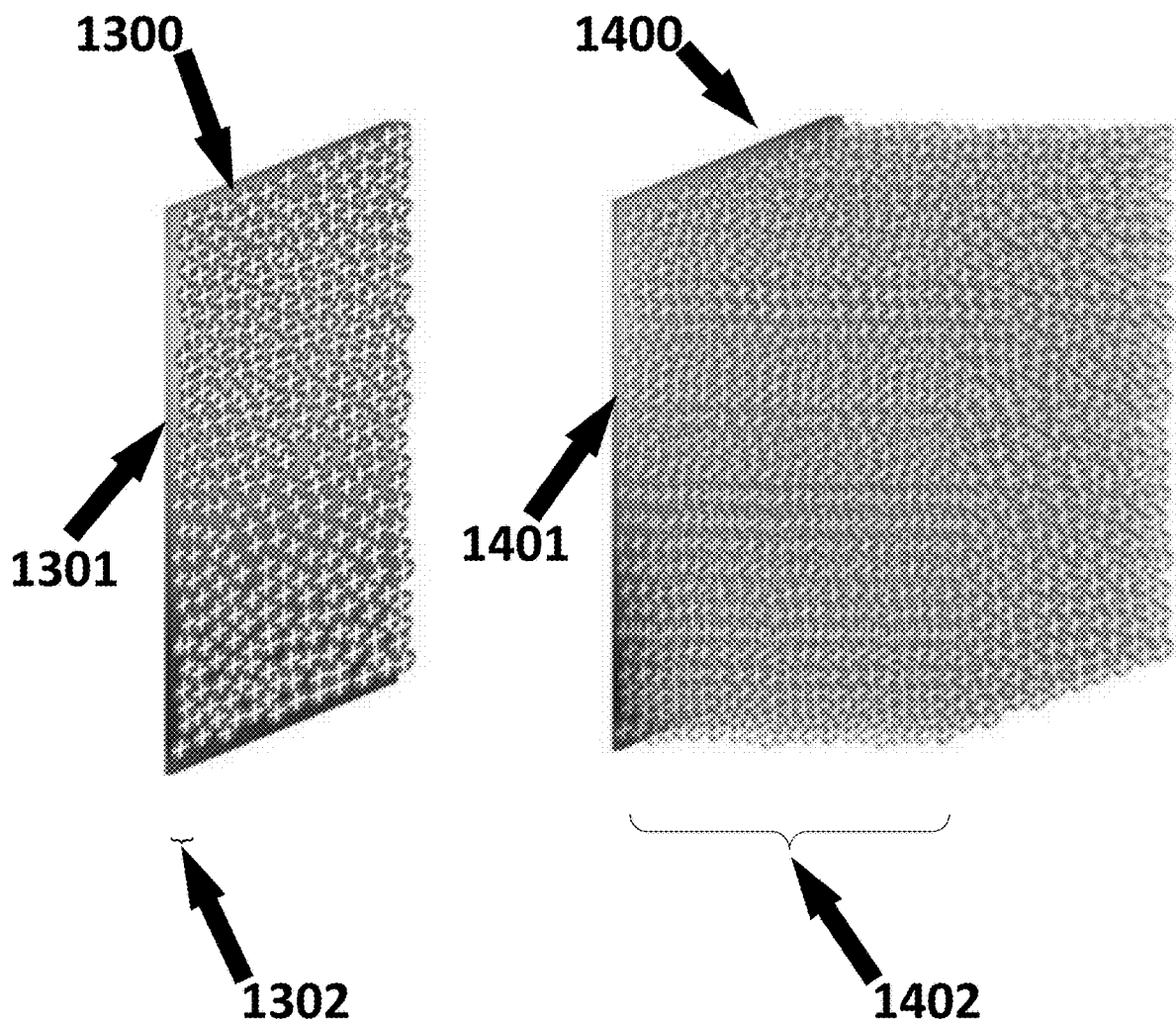

SOLID-STATE BATTERIES AND METHODS OF MAKING SOLID-STATE BATTERIES

CROSS-REFERENCE TO RELATED APPLICATIONS

The present application claims the benefit of U.S. Provisional Patent Application No. 63/243,054 entitled "SOLID-STATE BATTERIES", filed on Sep. 10, 2021. The entire contents of the above-listed application are hereby incorporated by reference for all purposes.

BACKGROUND

Energy is one of the quintessential drivers of modern technology. Paramount with the need to produce energy is the need to store it and deliver it for later use. An example of energy storage is the use of a battery to chemically store electric potential. Batteries can have stationary implementations, such as power storage to collect and store energy generated from nuclear, solar, wind, hydroelectric, or carbon-based energy sources. Additionally, batteries can be employed for nomadic, or mobile, implementations, such as for use with vehicles, computers, medical implants, lightweight military communications, phones, boats, drones, or airplanes.

SUMMARY

The present disclosure is directed to solid-state batteries, substantially as shown in and/or described in connection with at least one of the figures, as set forth more completely in the claims.

There is disclosed a device comprising a cathode comprising graphene, sulfur, and phosphorus, wherein the graphene comprises between 2 and 50 layers of graphene sheets, the sulfur is covalently bonded to the graphene, and the phosphorus is bonded to the sulfur, an anode comprising graphene and silicon, a separator comprising an ion-conductive material and a binder, wherein the ion-conductive material is one of a lithium sulfur phosphate $Li_6PS_5Cl$, and an argyrodite, and the separator is located between the anode and the cathode, a first current collector and a second current collector, wherein the first current collector is copper and affixed to the anode, and the second current collector is aluminum and affixed to the cathode, and a first housing and a second housing, wherein the first housing is affixed to the anode, and the second housing is affixed to the cathode, and the device is a solid-state battery comprising one with no liquid electrolyte or one with liquid electrolyte.

In some embodiments, the graphene is 10-60% of the cathode, the sulfur is 30-80% of the cathode, the phosphorus is 1-10% of the cathode, and the graphene is an edge functionalized graphene comprising 2-50 sheets of graphene.

In some embodiments, the graphene comprises a mixture of edge functionalized graphene covalently bonded to sulfur, and the edge functionalized graphene is without sulfur.

In some embodiments, the separator has a thickness between 1 to 50 μm, the cathode has a thickness between 65 and 400 μm, and the sulfur comprises $S_8Li_6$ covalently bonded to the graphene.

In some embodiments, the cathode further comprises an ion-conductive material dispersed in the cathode, the ion-conductive material is lithium tin phosphorus sulfide or lithium phosphorus sulfur chloride, and the ion-conductive material is configured to increase electron and ion flow within the cathode.

In some embodiments, the sulfur is $S_2$-$S_8$ milled to uniform sub-micron particle size and cross-links the graphene sheets.

There is disclosed a system comprising a first reservoir configured to contain a first constituent material, wherein the first constituent material is a mixture of graphene, sulfur, and phosphorus, a second reservoir configured to contain a second constituent material, wherein the second constituent material is a mixture of a separator and a binder, a mixer configured to mix either the first constituent material and the second constituent material into a mixture, or mix the first constituent material and the second constituent material separately, a first pump configured to pump the first constituent material from the first reservoir to the mixer, a second pump configured to pump the second constituent material from the second reservoir to the mixer, a spray nozzle configured to spray the mixture toward a substrate, and a high-voltage source configured to provide an electric potential difference between the substrate and the spray nozzle.

In some embodiments, the spray nozzle is configured to provide a microdroplet spray of the mixture towards the substrate, and the microdroplets have a median diameter of 1 to 100 μm.

In some embodiments, the spray nozzle is configured to provide an ultrasonic spray deposition of the mixture towards the substrate, and the spray nozzle is configured to provide spray pattern geometries, spacing, and spray pattern overlap to provide uniformity of deposition to the substrate.

In some embodiments, the system further comprises a heater configured to heat the substrate, and an electric control unit configured to control the spray nozzle, wherein the high-voltage source is a high-voltage DC energy source configured to apply a polarity to the substrate that is an opposite polarity of the microdroplets.

In some embodiments, the system further comprises a first mixer and a second mixer, wherein the first mixer is configured to mix the graphene, sulfur and phosphorus to form a first constituent mixture, and the second mixer is configured to mix the separator and binder to form a second constituent mixture.

In some embodiments, the first constituent mixture is configured to be deposited onto a substrate to form a first constituent deposition, and the second constituent mixture is configured to be deposited onto the first constituent deposition.

There is disclosed a method comprising preparing a cathode comprising graphene, sulfur, and phosphorus, wherein the sulfur and phosphorus are mixed together and then mixed with the graphene, preparing an anode comprising graphene and silicon, wherein the graphene and silicon are mixed together and the mixture is deposited on a copper current collector plate, and preparing a separator comprising an ion conducting material and a solvent, wherein the ion conducting material and solvent are mixed together and deposited onto the cathode, and the cathode, separator, and anode are assembled to form a solid-state battery without a liquid electrolyte layer. In some implementations, the anode does not include graphene.

In some implementations, the separator is deposited onto the cathode via spin-coating, and a mixture of the ion conducting material and solvent is sprayed onto the cathode, spun to homogenize the mixture, spun again to further homogenize the mixture, and then subjected to evaporation to remove excess solvent.

In some implementations, the solvent is a binder and the binder may be selected from the group consisting of carrageenan, polyvinyl acetate, denatured gelatin, argyrodite ion transport materials, or other possible candidates.

In some implementations, the graphene, sulfur and phosphorus are deposited on a battery grade aluminum and annealed via a xenon flash, laser or other heating processes.

In some implementations, the sulfur is plastic sulfur, and the plastic sulfur and phosphorus are mixed at a melting temperature of the plastic sulfur, followed by rapid cooling, and cross-linking with the graphene.

In some implementations, the cathode is less than 400 µm in thickness, the separator is less than 10 µm in thickness, and the anode is less than 300 µm in thickness.

In some implementations, the graphene comprises a mixture of edge-functionalized graphene covalently bonded to sulfur, and edge functionalized graphene without sulfur, and the sulfur is $S_2$-$S_8$ milled to uniform sub-micron particle size and is covalently bonded and cross-linked between the edge-functionalized graphene.

In some implementations, the graphene is 20-50% of the cathode, the sulfur is 40-70% of the cathode, and the phosphorus is 2-6% of the cathode.

In some implementations, the electrospray or ultrasonic spray process allows for graduating the ratio of any combination of the three main elements of a solid-state battery, the cathode, separator and anode, which can gradually be blended together to avoid a sharp junction between the various disparate layers as desired. For example, the cathode material can be graduated to include a ratio of less cathode material and more separator material to blend the layers without a sharp delineation between the two elements. This may apply to the separator material blending into the anode, again by graduating the material ratios of the normally two disparate elements to mitigate the delineation between the layers. The separator may gradually blend into one or both of the electrodes as needed for increased ion conduction and for eliminating the SEI.

In some implementations, the electrospray or ultrasonic spray process allows for graduating the ratio of any combination of the three main elements of a solid-state battery, the cathode, separator and anode, which can therefore gradually be blended together to avoid a sharp junction between the various disparate layers as desired. That also means that the separator material, possibly an argyrodite such as LiPSCl or a similar solid ion conductor, can be blended throughout the cathode and/or anode all the way to the current collectors to provide continuity and reliably fast ion conduction throughout one or both of the electrodes. This allows for thick electrode(s) that would have greater energy density in both weight and volume than current thin-film batteries and vastly simplify the manufacturing process.

In some implementations, the electrospray or ultrasonic spray process allows for graduating the ratio of any combination of the three main elements of a solid-state battery, the cathode, separator and anode, which can therefore gradually be blended together to avoid a sharp junction between the various disparate layers as desired. A novel variation of this unique process would allow the electrodes to be blended into their respective electrodes: the cathode may gradually be blended into the aluminum via a varying ratio of cathode material and aluminum nanoparticles, or similar. This would provide extremely fast electron conduction with far greater surface area than traditional batteries from electrode to current collector.

In some implementations, the anode may gradually be blended into the copper current collector via a varying ratio of anode material and copper nanoparticles, or similar. This would provide extremely fast electron conduction with far greater surface area than traditional batteries from electrode to current collector.

In some implementations, the electrospray or ultrasonic spray process allows for spray deposition of a battery in situ to construct shapes specifically designed for a true "structural" or "massless" battery integrated into the device parts, examples include the rear plate of a smart phone, the case of a smart watch, or the back of a dashboard to conserve weight and minimize connecting wires. The shape can be designed into the device and does not necessarily need to be flat; the manufacturing process consists of coating a curved surface.

In some implementations, the electrospray or ultrasonic spray process allows for spray deposition of a battery in a roll-to-roll method of spraying the active nano and microparticles onto a substrate such as the current collector, and as the build goes to the next chamber it receives another spray-deposited layer, precisely controlled in terms of the ratio of materials, onto the next elements of the battery in a gradual and blended fashion, and so on until the battery is at the end of the assembly line. The exacting computer control of the spray deposition processes, the simplicity of each step and process, and the ability to use powerful and environmentally-friendly materials yield decreased cost, better battery performance, unique shapes, and flexibility to provide customized batteries for exact purposes. The process is scalable to accommodate batteries for earbuds or main battle tanks as required.

BRIEF DESCRIPTION OF THE DRAWINGS

The present description will be understood more fully when viewed in conjunction with the accompanying drawings of various examples of solid-state batteries. The description is not meant to limit the solid-state batteries to the specific examples. Rather, the specific examples depicted and described are provided for explanation and understanding of solid-state batteries. Throughout the description the drawings may be referred to as drawings, figures, and/or FIGs.

FIG. 13 illustrates an example electrode, according to an embodiment.

FIG. 14 illustrates an example electrode, according to an embodiment.

DETAILED DESCRIPTION

Figure 1:
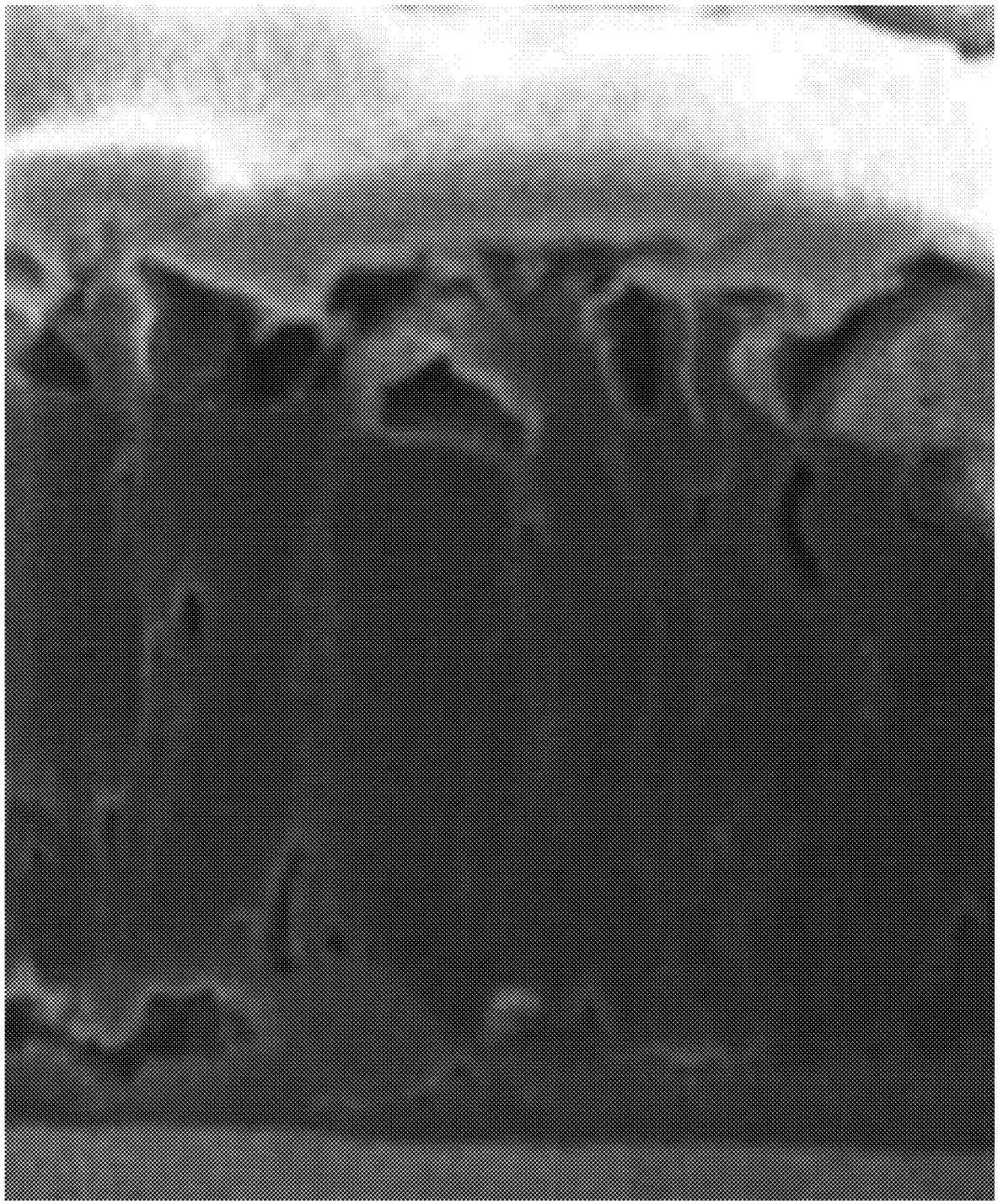
FIG. 1 illustrates a buildup of contaminants at a solid electrolyte interface of a conventional lithium-ion battery.

Solid-state batteries as disclosed herein will become better understood through a review of the following detailed description in conjunction with the figures. The detailed description and figures provide merely examples of the various embodiments of solid-state batteries. Many variations are contemplated for different applications and design considerations; however, for the sake of brevity and clarity, all the contemplated variations may not be individually described in the following detailed description. Those skilled in the art will understand how the disclosed examples may be varied, modified, and altered, and not depart in substance from the scope of the examples described herein.

Advances in technology have led to greater and greater need for easily portable energy storage devices of all sizes. A further aspect of modern energy storage has been the ability to repeatedly recharge the energy storage device. The ability to recharge storage devices provides greater utility for the stationary storage devices that can be repeatedly stored and discharged, as well as for mobile devices to save money and resources on one-time use batteries. These rechargeable batteries are often referred to as secondary batteries.

Modern rechargeable batteries, or secondary batteries, include nickel-cadmium (NiCd) batteries, nickel-metal hydride (NiMH) batteries, and lithium-ion batteries (LIB), many of which have cathodes containing nickel, manganese, and cobalt (NMC). The current battery systems provide energy storage and rechargeability, however there is a need for batteries with higher energy density, higher capacity, better reliability, greater safety, and lower cost.

Automotive battery systems for electric vehicles (EV's) can include 4,000 to 7,000 or more conventional laptop-type batteries, generally employing a combination of NMC as the cathode material, a carbonaceous material as the anode, and a liquid salt as the electrolyte to allow transport of the ions to and from the anode. During the charging of conventional lithium-based rechargeable batteries, the lithium ions in the cathode travel to the anode. Due to the circuitous and complex pathways inherent in conventional designs, ion transport leads to lithium plating, which eventually builds up and creates a barrier at the interfaces. Lithium plating can render a battery useless after relatively few cycles. Conventional lithium-ion batteries include a separator or a simple screen in the middle of the liquid salt solution to impede the flow of electrons from one electrode to the other to prevent short circuits.

Conventional lithium-ion batteries include a negative electrode, referred to as an anode during discharge, a positive electrode, referred to as a cathode during discharge, a liquid electrolyte for ion and electron transport, and a separator to block electrons and allow passage of ions. Generally, the negative electrode or anode is prepared from materials containing carbon, lithium, tin, or silicon. Anode materials can have varying energy densities. Silicon, an inexpensive and abundant material, has a high energy density of approximately 6,000 watt-hours per kilogram (Wh/kg), and is also very non-reactive. Metal lithium, which is very reactive and will likely become harder to source, has a higher energy density, approximately 7,400 Wh/kg. Graphite, also a relatively inexpensive and abundant material, has a relatively low energy density of approximately 1,200 Wh/kg. The energy densities of typical anode materials is shown in Table 1.

TABLE 1

The energy density of common anode materials

Watt-hours per kg

| | |
|---|---|
| Graphite | 1,200 |
| Silicon | 6,000 |
| Lithium | 7,400 |

The positive electrode or cathode is generally prepared from oxides of lithium manganese, lithium cobalt oxide, iron sulfides, vanadium oxides, lithium nickel cobalt manganese oxide, lithium-ion phosphate, and/or other electronic conducting polymers.

Cathode materials can have varying energy densities. Sulfur, an inexpensive, light, and abundant material, has a high energy density of approximately 2,600 Wh/kg, but it is difficult to use due to volumetric expansion/contraction, which reduces cycle life. NMC-based cathodes, which contain rare earth materials, have a lower energy density of approximately 150-220 Wh/kg but are easier to produce and use. Graphite, also used in anodes, is a relatively inexpensive and abundant material, and has a low energy density of approximately 1,200 Wh/kg.

The electrolyte is generally a liquid solution containing an organic salt capable of facilitating ion transport from the cathode to the anode. The separator can consist of a thin, porous membrane which is used to block the flow of electrons inside the battery. Separators are often non-conductive, semi-permeable materials prepared from single-layer or multi-layer polymer sheets generally made of polyolefins, such as polyethylene or polypropylene, that allow ions to pass from one electrode to the other.

Lithium-ion batteries suffer from numerous problems including low energy density, low power capability, high cost, rare and often environmentally unfriendly materials, and safety issues. Further, conventional lithium-ion batteries suffer from flammability, long charging times, dendrite formation, and manufacturing complexity.

Cathodes prepared from sulfur-containing materials can provide increased energy density and higher power capability than conventional lithium-ion batteries. Further, sulfur is more cost efficient and more readily available than NMC. Additionally, solid-state batteries, which do not use liquid electrolyte solutions to assist in ion transport, can be safer, lighter, and less costly than conventional lithium-ion batteries.

Electric vehicles have created vast incentives to improve the current battery technology. Current lithium-ion batteries are usually the single most expensive component in an electric vehicle. Additionally, the energy density and power capacity of conventional lithium-ion batteries are often lower than conventional internal combustion engines (ICE's). While electric vehicles (EVs) provide substantial benefits over ICE vehicles in the realm of lower carbon usage, sustainability, and environmental impact, currently, EVs are lacking in cost-effectiveness and overall mileage range. Further, the production of conventional EV batteries is environmentally unfriendly and entails significant supply chain challenges.

Cathodes prepared from sulfur-containing materials can alleviate many of the deficiencies of lithium-ion batteries, while simultaneously providing substantial environmental benefits over not just existing ICE vehicles, but existing lithium-ion battery vehicles as well. Sulfur has the potential for a much higher energy density than conventional lithium-ion battery cathode materials. Specifically, compared to NMC, sulfur is several times more energy dense, more abundant, and much less toxic. Sulfur, which is environmentally friendly, highly abundant, and cheap to use, offers a high theoretical specific energy density (2600 Wh/kg) and a safe operating voltage (1.6-2.4 V).

Previous attempts at using sulfur as a cathode material have exhibited numerous problems, including gradual layering or contamination of the transition areas within a battery, such as from the cathode to the separator to the anode. Additionally, build-up of contaminants and/or unwanted byproducts can occur at the junctions or interfaces within the battery (e.g., the Solid Electrolyte Interphase or SEI), or at contact points between layers of the battery. Attempts to make lithium-sulfur batteries have been plagued by low rechargeability, rapid capacity fading, polysulfide dissolution, insufficient control, and many complications at the electrode/electrolyte interface.

Solid-state batteries with sulfur as a cathode material can address the problems described above. More specifically, a solid-state battery including a lithiated sulfurized carbon cathode, a separator composed of lithium tin phosphorus sulfide (LSPS) or an argyrodite, such as lithium phosphorus sulfur chloride ($Li_6PS_5Cl$, "LiPSCl"), and a siliconized anode can overcome numerous deficiencies of the prior art. Solid-state batteries have the potential to overcome many structural and safety issues related to batteries employing liquid electrolyte components. In common battery manufacturing parlance, the term "solid-state" indicates that at least the separator is made up of a solid material without the large reservoir of liquid electrolyte; the separator is typically in contact with both electrodes. The removal or reduction of the liquid electrolyte components reduces fire and explosion issues related to shorts in the battery when the liquid electrolyte components dry up or are lost due to damage to the battery. Additionally, materials that are specifically designed to contain and protect the volatile liquid electrolyte components of a battery are not nearly as necessary in a solid-state battery. This leads to less cost, less volume, less weight and greater choice of form and structure for the battery. In the best mode, the "solid-state" battery would not include a liquid electrolyte.

These improvements in battery technology and sustainability are applicable to all current uses for secondary batteries from generator storage to mobile usage.

FIG. 1 illustrates a scanning electron microscope (SEM) generated image of contaminant build-up in a conventional lithium-ion battery. Contaminants can build-up in the liquid electrolyte component over time at the traditional SEI, as illustrated in, for example, the SEM image of FIG. 1. These contaminants can be the result of trapping of unwanted byproducts and loose particles (often sulfur) at the SEI, which is known to occur with sulfur-containing cathodes at the separator, particularly in liquid electrolyte regimes.

Figure 2:
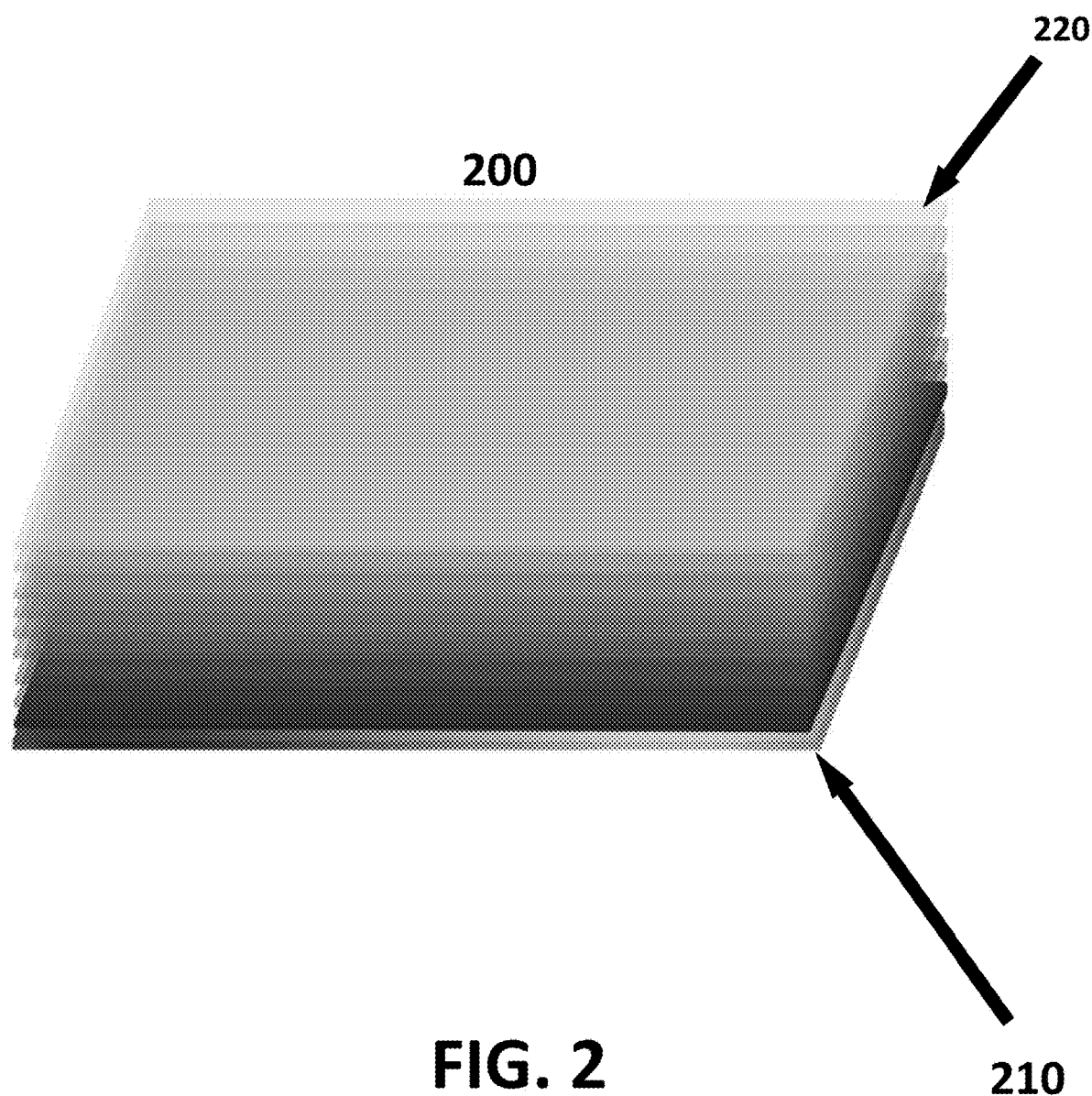
FIG. 2 illustrates a layered construction of a cathode, according to an embodiment.

FIG. 2 illustrates a layered construction of a cathode 200, according to an embodiment. The cathode 200 is layered on a substrate 210, and successive layers of cathode material 220 can be built-up to a desired thickness. In embodiments including a sulfur and graphene cathode, the construction of the cathode can be gradated to control the densities of the cathode materials to allow easy movement or flow of ions and inhibit the conduction of electrons. The cathode can be constructed to hinder ions near the separator, yet completely block electrons from traveling from one electrode to the other. In contrast, conventional lithium-ion batteries can include impediments to the transfer of ions.

Deposition of layers in a gradient fashion while constructing the cathode can solve the trapping problem. A construction including less dense layers as the layers approach an interface in the battery can alleviate the inevitable contaminants or chemical by-products. Any contaminants or chemical by-products can be trapped in earlier layers and not get close enough to an interface to compromise the integrity of the battery. This results in increased Coulombic efficiency and battery longevity.

Additional embodiments can provide a forgiving fabrication or preparation method that does not require precise placement of materials, but instead employs precise ratios of materials, particularly when using solutions of materials in spraying steps. This can lead to an absence of corners and edges in the cathode material, which can improve ion transfer within the battery cell and decrease a susceptibility to buildup of contaminates.

Figure 3:
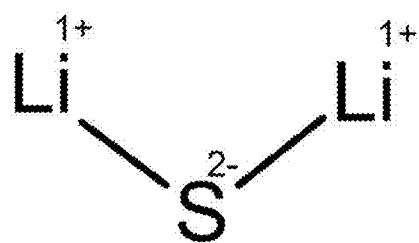
FIG. 3 illustrates an example molecule of lithiated sulfur, according to an embodiment.

FIG. 3 illustrates lithium sulfide ($Li_2S$), which is an example of a lithiated sulfur, according to an embodiment. Lithium in ionic form ($Li^+$) acts as the ion moving from the anode to the cathode during discharge of a battery, and then returns to the cathode during charging of the battery. The sulfur atom in the lithium sulfide is the electronegative component of the lithium sulfide molecule and will have a negative charge ($S^{2-}$) when disassociated from the positive $Li^+$ ions.

Figure 4:
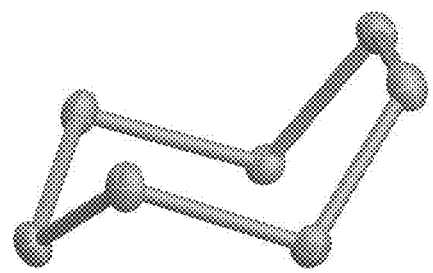
FIG. 4 illustrates a sulfur molecule structure, according to an embodiment.

FIG. 4 illustrates a sulfur molecule structure, according to an embodiment. The molecule illustrated in FIG. 4 is an $S_nLi_2$ molecule, lithium polysulfide, wherein n can be from 1 to 8. The embodiment in FIG. 4 is $S_7Li_2$. The lithium sulfur molecule structure can be bonded to a graphene structure which acts as scaffolding for the lithium sulfur molecule. Preferably the sulfur atoms are covalently bonded to the graphene structure. These embodiments can provide high-efficiency cathode construction.

Figure 5:
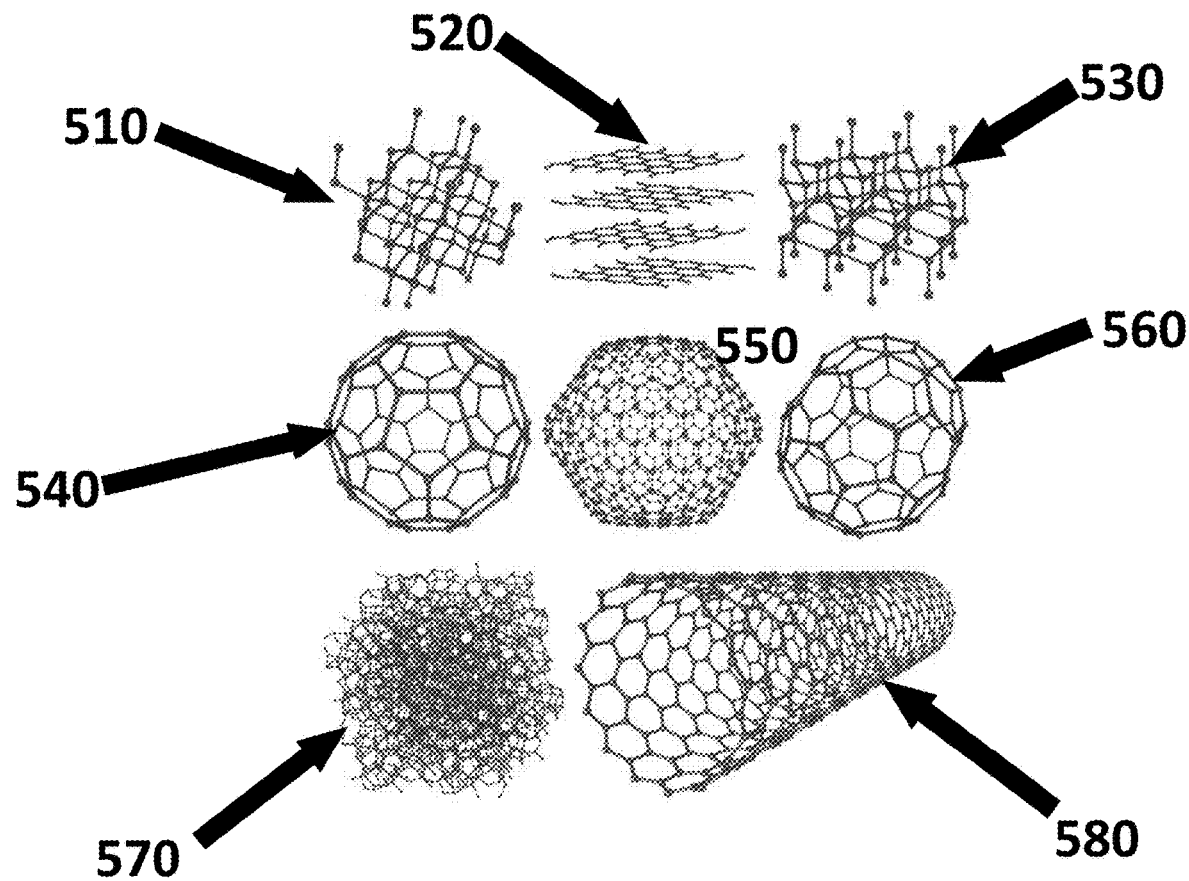
FIG. 5 illustrates various allotropes of graphene, according to an embodiment.

FIG. 5 illustrates various allotropes of graphene, according to an embodiment. Graphene is a one-atom-thick layer of carbon atoms arranged in a hexagonal lattice. Graphene is the building-block of graphite (the physical form of carbon used in pencil tips). Graphene is also an excellent conductor of heat and electricity. Various allotropes of graphene can be used as the backbone or scaffolding for the lithiated sulfur in the cathode. Examples include, but are not limited to, diamond 510, sheets or platelets 520, Lonsdaelite 530, buckminsterfullerene 540, fullerite 550, C70 560, amorphous graphite 570, and/or carbon nanotubes 580 (CNTs, which can be described as rolled-up graphene). In an embodiment employing carbon nanotubes, the CNT's can range from 0.5-5 μm in diameter to 10-100 μm in length. A combination of some or all of various allotropes may be used. In embodiments where spatial uniformity is desired, CNTs and/or sheets may be used. Varying layers of the battery may employ different morphologies of graphene, depending on the needs of the given embodiment or layer.

Figure 6:
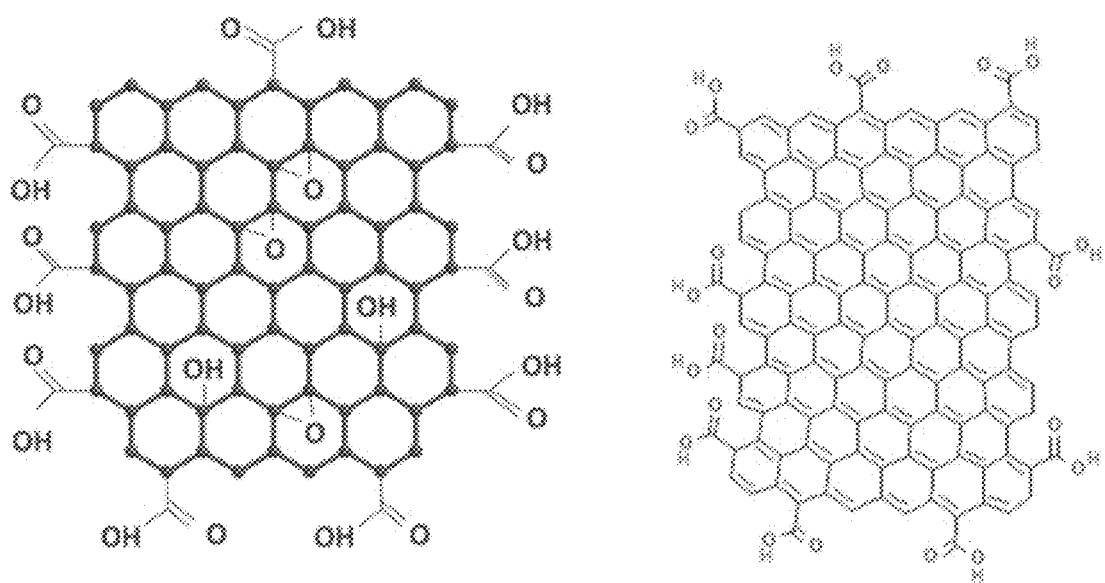
FIG. 6 illustrates Graphene allotropes that can be used for sulfurization, according to an embodiment.

FIG. 6 illustrates graphene allotropes that can be used for sulfurization, according to an embodiment. Sheets of graphene can be functionalized with hydroxyl (OH) groups and/or carboxyl groups (COOH). Additional embodiments include platelet or sheet graphene functionalized with fluorine (F) groups, multi-walled nanotubes with no functionalization, or multi-walled nanotubes functionalized with hydroxyl (OH) groups. Levels of sulfurization and characterization of the resulting functionalized graphene can be varied to select an allotrope or allotropes for use in a given embodiment. Sulfurization can determine the allotrope most conducive to maximizing the ideal mass amount of sulfur. Characterization can, for example, determine an allotrope's ability to deposit in physical contact with other structures of the allotrope or of other allotropes. For example, characterization can be a determination based on surface area of structures of a given allotrope.

Figure 7:
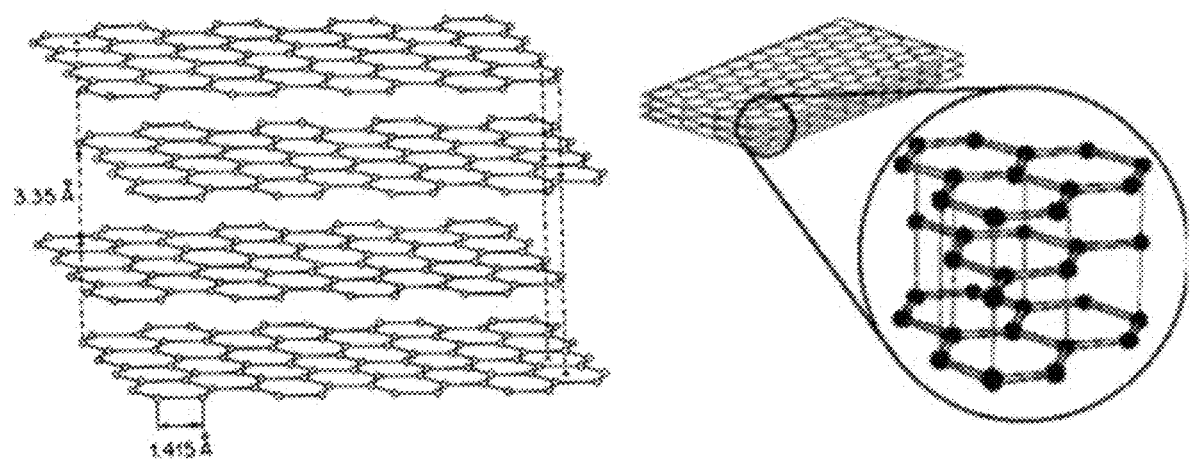
FIG. 7 illustrates a stacking of single graphene platelets or sheets, according to an embodiment.

FIG. 7 illustrates a stacking of single graphene platelets or sheets, according to an embodiment. Embodiments of the individual sheets were discussed above with regard to FIG. 6 (an illustration of a single functionalized graphene platelet or sheet, according to an embodiment). The functionalized graphene can be stacked and the individual platelets or sheets are held together by Van der Waal's forces, with functionalization occurring only at the edges. The spacing between the sheets is illustrated to be 3.35 Å, and the distance between carbon atoms in the graphene is 1.415 Å. FIG. 7 illustrates a graphene sheet without sulfurization at approximately 235° C. Graphene sheets can be prepared in various layers ranging from 2-50 layers. Embodiments include 2-5, 2-10 layers and 48-50 layers.

Figure 8:
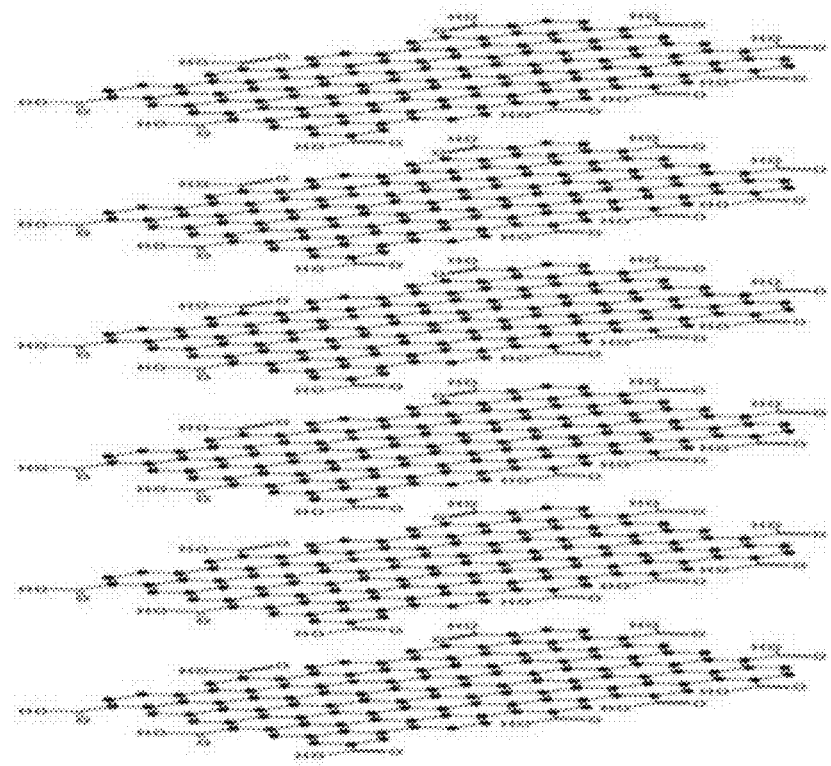
FIG. 8 illustrates an embodiment of the stacked graphene sheets, according to an embodiment.

FIG. 8 illustrates an embodiment of the stacked graphene sheets, according to an embodiment. The graphene sheets illustrated in FIG. 8 include functionalized groups (OH, COOH) only present at the edges of the sheets. The graphene is an edge functionalized graphene (EFGO), which is available in multi-layer formations, for example 2-10 layers or 48-50 layers. The EFGO is a highly conductive material with carboxyl (COOH) and hydroxyl (OH) edge functional groups. The EFGO graphene allows electrons to travel through the highly-conductive graphene, and allows the lithium ions to travel in-between the layers of graphene.

Figure 9:
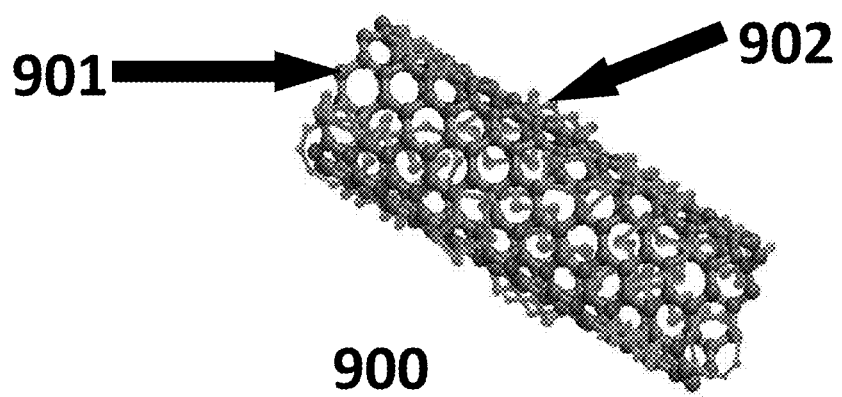
FIG. 9 illustrates a sulfurized carbon nanotube, according to an embodiment.

FIG. 9 illustrates a sulfurized CNT 900, according to an embodiment. The sulfurized CNT 900 can provide an efficient structure to deposit the lithiated sulfur material. The sulfurized CNT 900 can also operate as a cathode material. The sulfurized CNT 900 includes lithiated sulfur molecules 902 deposited within a CNT 901. The carbon of the graphene CNT structure can be in physical conduct with other graphene micro- and/or nano-particle structures. This allows the graphene structure to be a scaffold stabilizing the sulfur molecules in various configurations (e.g., $S_1$-$S_8$). Each sulfur atom may be lithiated, and thus carry up to two lithium atoms. The sulfurized CNT is also an efficient electron conductor, allowing it to provide for increased power output.

The sulfurized CNTs can be deposited using a spray method. Use of such methods can provide for precise dispersion of sulfur within the cathode. The spray method can also provide a gradient mixing with, for example, ceramic separator particles to eliminate hard interfaces. This can lead to an improvement in ion transport within the cathode layers. This is also true of many other carbon allotropes.

Previous attempts to use sulfur in bulk form have resulted in large volumetric changes during the charge-discharge phases of a battery cell. This volumetric change can disable the link between the cathode and anode due to change in shape of the cathode or buildup of unwanted byproducts, either as thin layers within the cathode, or layered at interfaces within the battery, such as the separators, connectors, and/or collectors. However, when the sulfur is bonded to the graphene backbone, the volumetric change does not occur due to the separation of sulfur atoms from one another. Because the sulfur atoms are covalently bonded to the graphene scaffolding, they cannot clump together and produce unwanted, unpredictable, and/or unknown chemical reactions due to the sulfur atoms or molecules being in free and open contact with each other or with contaminants. The lack of clumping and unwanted side reactions allows the sulfur to be available for ion transfer.

Figure 10:
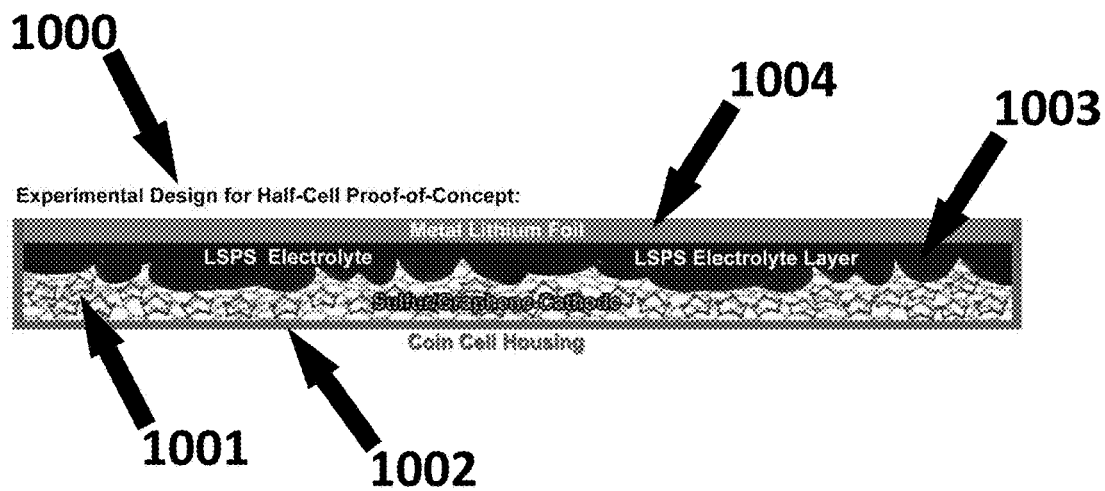
FIG. 10 illustrates a half-cell of solid-state battery, according to an embodiment.

FIG. 10 illustrates a half-cell of a solid-state battery 1000, according to an embodiment. The half-cell of a solid-state battery 1000 includes a sulfur-graphene cathode 1001 disposed within a housing 1002. An electrolyte layer 1003 disposed on the sulfur-graphene cathode 1001, and a metal lithium foil 1004 used to seal the half-cell formed by the battery 1000. The battery 1000 can provide efficient power delivery without significant buildup of contaminants that would otherwise shorten a battery's useful life.

A separator used in embodiments herein can be, for example, an LSPS separator. The LSPS separator can impede electron flow between electrodes and is also as an effective ion conductor. The LSPS electrolyte layer enables ions to reach the anode and blocks any electrons from migrating from the cathode to the anode. Alternative separators include solid particles of lithium phosphorus sulfide chloride ($Li_6PS_5Cl$). Mixtures comprising lithium bis(trifluoromethanesulfonyl)imide (LiTFSi) and lithium nitrate ($LiNO_3$) in 1:1 DME:DOL (dimethoxy ethane:dioxolane) solution (among others) can be used for liquid electrolyte preparations and/or solutions.

Embodiments of solid-state batteries can provide a significant increase in specific energy density, for example as measured in a nominal dimensional unit of Wh/kg. Embodiments of solid-state batteries can provide improved safety, for example, reduced risk of shorting between anode and cathode, which can result in combustion or explosion. Embodiments of solid-state batteries can provide reduced detrimental environmental impact from both mining and disposal due to the replacement of toxic materials, for example heavy metals, with non-toxic materials, for example carbon, silicon, and/or sulfur. Embodiments of solid-state batteries can provide increased long-term availability due to the replacement of scarce materials with abundant materials such as carbon, silicon, and/or sulfur. Embodiments may further provide for decreased energy consumption required for manufacturing due to a change in the manufacturing process, decreased charging times, decreased manufacturing expense, and flexibility in the form or shape of the battery.

Figure 11:
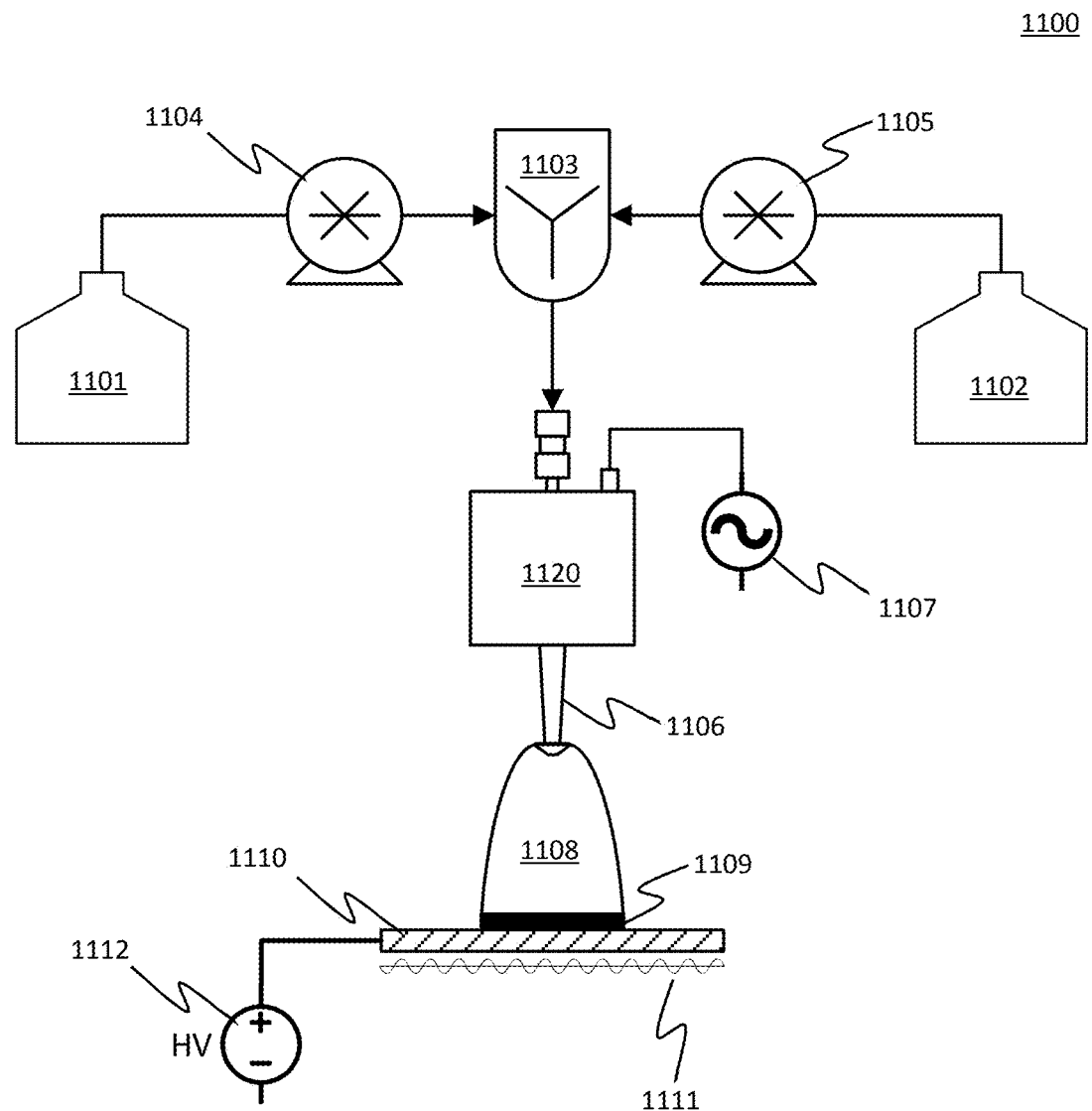
FIG. 11 illustrates a system for manufacturing a solid-state battery, according to an embodiment.

FIG. 11 illustrates a system 1100 for manufacturing a solid-state battery, according to an embodiment. The system 1100 provides for even disbursement of a mixture on a substrate 1110.

The system 1100 includes a first reservoir 1101 configured to contain a first constituent material, which can include a separator in a solvent mixture, such as LSPS or LiPSCl in solvent. The system 1100 also includes a second reservoir 1102 configured to contain a second constituent material, which can be a cathode material in a solvent, such as sulfurized CNTs or other graphene allotropes, or mixture of graphene allotropes, suspended in solvent. The system 1100 further includes a mixer 1103 configured to mix the first constituent material and the second constituent material into a mixture, a first pump 1104 configured to pump the first constituent material from the first reservoir 1101 to the mixer 1103, a second pump 1105 configured to pump the second constituent material from the second reservoir 1102 to the mixer 1103. The mixer 1103 can be in separate components, including a first mixer and a second mixer, wherein the first mixer is configured to mix the graphene/CNT, sulfur and phosphorus, to form a first constituent mixture, and the second mixer is configured to mix the separator and binder/solvent to form a second constituent mixture. In this embodiment the first constituent mixture is deposited onto a substrate, followed by the second constituent mixture being deposited onto the first constituent deposition, which is already on the substrate. Drying, evaporation, and/or heating techniques can be used to finish the composition.

The system 1100 further includes a spraying device 1120 with a spray nozzle 1106. Embodiments of the spray nozzle 1106 are configured to spray the mixture as a microdroplet spray 1108 toward a substrate 1110. Microparticles and/or nanoparticles can be suspended in a suitable solvent or carrier. The spray nozzle 1106 can be controlled by an electric control unit 1107. The microdroplet spray 1108 can form a deposition 1109 on a substrate 1110. In some implementations, the substrate is an aluminum substrate for forming a cathode. In other implementations, the substrate is a copper substrate for forming an anode.

The particle suspensions can be mixed at predetermined proportions. The particles in each suspension can be mixed with the solvent(s) at pre-determined mass concentrations and stored in tanks. Each suspension can be pumped at a controlled liquid flow rate into a mixer 1103, which can mix the suspensions homogeneously. Individual mixers (first mixer/second mixer, etc.) can mix the separator component and the cathode components separately, and then separately deposit them or combine them in mixer 1103.

The particle suspensions can be sprayed as microdroplets for deposition onto a suitable substrate, such as a metal collector. The metal collector can be aluminum, such as battery grade aluminum for the cathode, or copper, such as battery grade copper for the anode. The constituent materials can include, but are not limited to, LSPS, LiPSCl, a binder/separator material, and/or sulfurized CNTs and/or other graphene allotropes. The mixed suspension can be fed into a spraying device 1120, including a spray nozzle 1106 with appropriate control of the internal spraying mechanism. The spraying device 1120 can include, for example, a pneumatic nebulizer, an aerosol electrospray device, or an ultrasonic atomizer. In an example, an ultrasonic atomizer can be used to provide a wide range of configurable liquid flow rates, control of spray pattern geometries, and a wide range of achievable median droplet diameter, droplet size uniformity, spray uniformity, low energy consumption, and robust operation. Nozzle geometries can be varied, including focused (convergent), flat (straight), or conical (divergent) spray patterns.

Microdroplets, with a median diameter from 1 to 100 µm, can be generated by the spray nozzle 1106. The microdroplet spray 1108 can be directed toward the substrate 1110 for deposition.

In some implementations, the solvent may be removed by evaporation. In some implementations, the solvent may be removed by other standard means. In some implementations, the solvent may be kept in place and included as constituent in a solidified binder. In an embodiment, the evaporation occurs in a gaseous environment during deposition of the solution, suspension and/or mixture onto the substrate. This results in dry deposited microparticles and/or nanoparticles. Residual or excess solvent in the deposited particulate material can be dried by, for example, heating the substrate, applying laser energy, applying broadcast flash energy, or using other suitable techniques. In some embodiments, exposure to intense laser energy or flash energy may have a secondary benefit of annealing the materials and enhancing the structural integrity of the electrode. The spray method reduces the long and complex energy-intensive drying process traditionally associated with the manufacturing of conventional liquid-based lithium-ion batteries.

Embodiments include a method for producing a solid-state battery including a first reservoir 1101 configured to contain a first constituent material, a second reservoir 1102 configured to contain a second constituent material, a mixer 1103 configured to mix the first constituent material and the second constituent material into a mixture, a first pump 1104 configured to pump the first constituent material from the first reservoir 1101 to the mixer 1103, a second pump 1105 configured to pump the second constituent material from the second reservoir 1102 to the mixer 1103, and a spray nozzle 1106 configured to spray the mixture as a microdroplet spray 1108 toward a substrate 1110.

The substrate 1110 can be heated to a set temperature by a heater 1111. The substrate 1110 can be connected to a high-voltage source 1112 to provide for an electric potential difference between the substrate 1110 and the spray nozzle 1106. The electric potential difference causes a more efficient distribution and dispersion of the deposition 1109 on the substrate 1110.

In embodiments, high-voltage (HV) direct current (DC) energy can be applied to the substrate 1110, or a conductive plate placed under the substrate 1110 to generate an electric field between the substrate 1110 and the spray nozzle 1106, which in other embodiments is held at a ground potential. When dielectric liquids are separated into droplets by atomization or other techniques, the droplets become charged, often with one polarity, also known as unipolar charging. By applying HV DC energy of opposite polarity to the substrate, the droplets and resulting microparticles and/or nanoparticles are attracted to the substrate 1110, the spatial uniformity of the deposited material is enhanced, and the transfer (deposition) efficiency is increased to approximately 100%.

A single spray nozzle 1106 can be used, or multiple spray nozzles can be used. In embodiments involving high-volume manufacturing of solid-state batteries, wide web-based substrates moving at high speeds on conveyor systems can be sprayed with fixed arrays of multiple spray nozzles. Spray pattern geometries and spacing/spray pattern overlap can be adjusted for optimization of spray uniformity over the width of the substrate. To speed up overall processing, constituent material mass concentrations, liquid flow rates, droplet diameters, and drying/curing processes can be scaled up accordingly.

Embodiments include a device or solid-state battery including a cathode prepared from graphene, sulfur, and phosphorus, wherein the graphene includes between 10 and 50 layers of graphene sheets, wherein the sulfur is covalently bonded to the graphene, and wherein the phosphorus can be bonded to the sulfur. The solid-state battery further includes an anode prepared from silicon, a separator prepared from an ion conducting material and a binder, wherein the ion conducting material is lithium sulfur phosphate chloride, and wherein the separator is located between the anode and the cathode. The solid-state battery further includes a first current collector and a second current collector, wherein the first current collector is copper and affixed to the anode, and the second current collector is aluminum and affixed to the cathode. The solid-state battery further includes a first housing and a second housing, wherein the first housing is affixed to the anode, and the second housing is affixed to the cathode. The device is a solid-state battery without a liquid electrolyte layer. Embodiments includes the cathode, separator, and anode assembled to form a solid-state battery without a liquid electrolyte layer.

Figure 12:
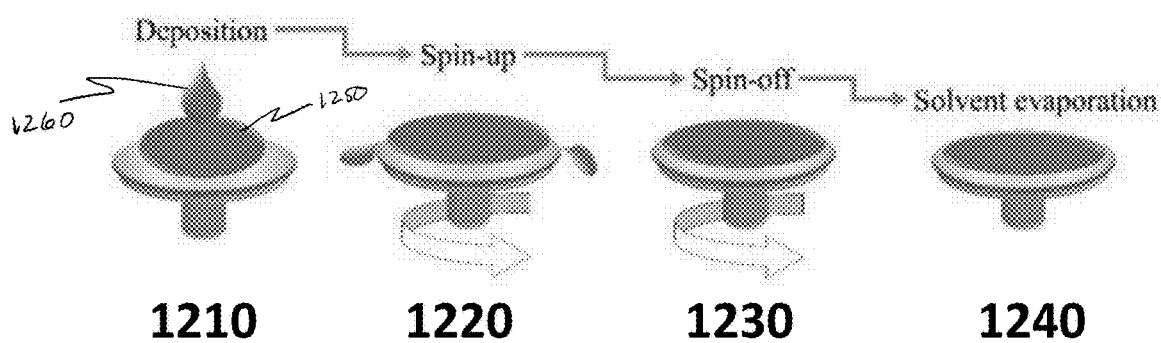
FIG. 12 illustrates a method of coating a cathode with a separator, according to an embodiment.

FIG. 12 illustrates a method of coating a cathode with a separator, according to an embodiment. The spin coating method 1200 illustrated in FIG. 12 applies a mixture, solution, or suspension of a separator/carrier mixture 1260 to a cathode 1250. The separator/carrier mixture 1260 is coated onto the cathode 1250 in a deposition step 1210. Next the cathode 1250 with the separator/carrier mixture 1260 is spun-up to homogenize the distribution of the separator/carrier mixture 1260 in spin-up step 1220. Then the cathode 1250 with the separator/carrier mixture 1260 is spun off to further homogenize and/or remove excess separator/carrier mixture 1260 in spin-off step 1230. Finally, the cathode 1250 is subjected to a solvent evaporation step 1240 to further remove excess separator/carrier mixture 1260. The evaporation step can be done with high heat, under gas, and/or with pressure variations, and/or with exposure to intense laser energy or flash energy to optimize the application of the separator to the cathode.

Alternatively, particle deposition processing, such as ultrasonic spray deposition, can be employed to apply a fine-particle separator coating to the cathode. A solid dry layer of separator is the final result of either the spin-coating process or particle deposition. The thickness of the separator coat can be varied to improve performance of the ultimate solid-state battery prepared according to the embodiments. Embodiments include a separator coating or layer between 0.1 to 10 µm thick. In some embodiments, the separator coating or layer may be less than about 5 µm thick. In some embodiments, the separator coating or layer may be between about 0.5 µm and 3 µm thick. Thickness of the separator may be directly related to faster, more reliable and increased ion transfer provided that the separator completely hinders electron transfer. Because the separator will be used in a solid-state battery with or without a liquid electrolyte component, the thickness of the separator can be reduced compared to conventional lithium-ion batteries.

Embodiments include the separator deposited onto the cathode via spin-coating, wherein a mixture of the ion conducting material and solvent is sprayed onto the cathode, spun to homogenize the mixture, spun again to further homogenize the mixture, and then subjected to evaporation to remove excess solvent.

FIG. 13 illustrates an example electrode 1300, according to an embodiment. The electrode 1300 can be employed where process parameters do not require a larger electrode. The electrode 1300 can include a layer of a constituent material 1302 dispersed on a substrate 1301. The thickness of the constituent material can range from, or between, 10 µm to 500 µm, between 100 and 500 µm, embodiments can include a thickness of equal to or less than 100 µm, 200 µm, 300 µm, 400 µm, 500 µm or intermediate thicknesses. The electrode can be the cathode or the anode.

FIG. 14 illustrates an example electrode 1400, according to an embodiment. The electrode 1400 can be employed where process parameters require a larger electrode (larger than the embodiment in FIG. 13). The electrode 1400 can include a layer of a constituent material 1402 dispersed on a substrate 1401. An embodiment can include, a graphene-sulfur constituent material, a separator and a binder, and be layered to form a thickness of, for example, between 1 to 2 mm. Embodiments can include a thickness between or less than 0.5 to 10 mm, or between or less than 1 to 5 mm.

The solution used to deposit the separator and cathode constituent material, for example LSPS or LiPSCl and the graphene-sulfur constituent material, can include a binder, which can assist in binding the various materials in place and provide a chemical pathway for ions to reach an anode. The separator can compose an integral part of the battery, and can be configured to, in addition to blocking electrons from entering at the opposing electrode, facilitate an unimpeded flow of ions from cathode to anode. Embodiments enable ions to travel through the separator, for example LSPS, at a similar speed as through an organic liquid electrolyte. Examples of binders include, but are not limited to carrageenan, polyvinyl acetate, and/or denatured gelatin.

Figure 15:
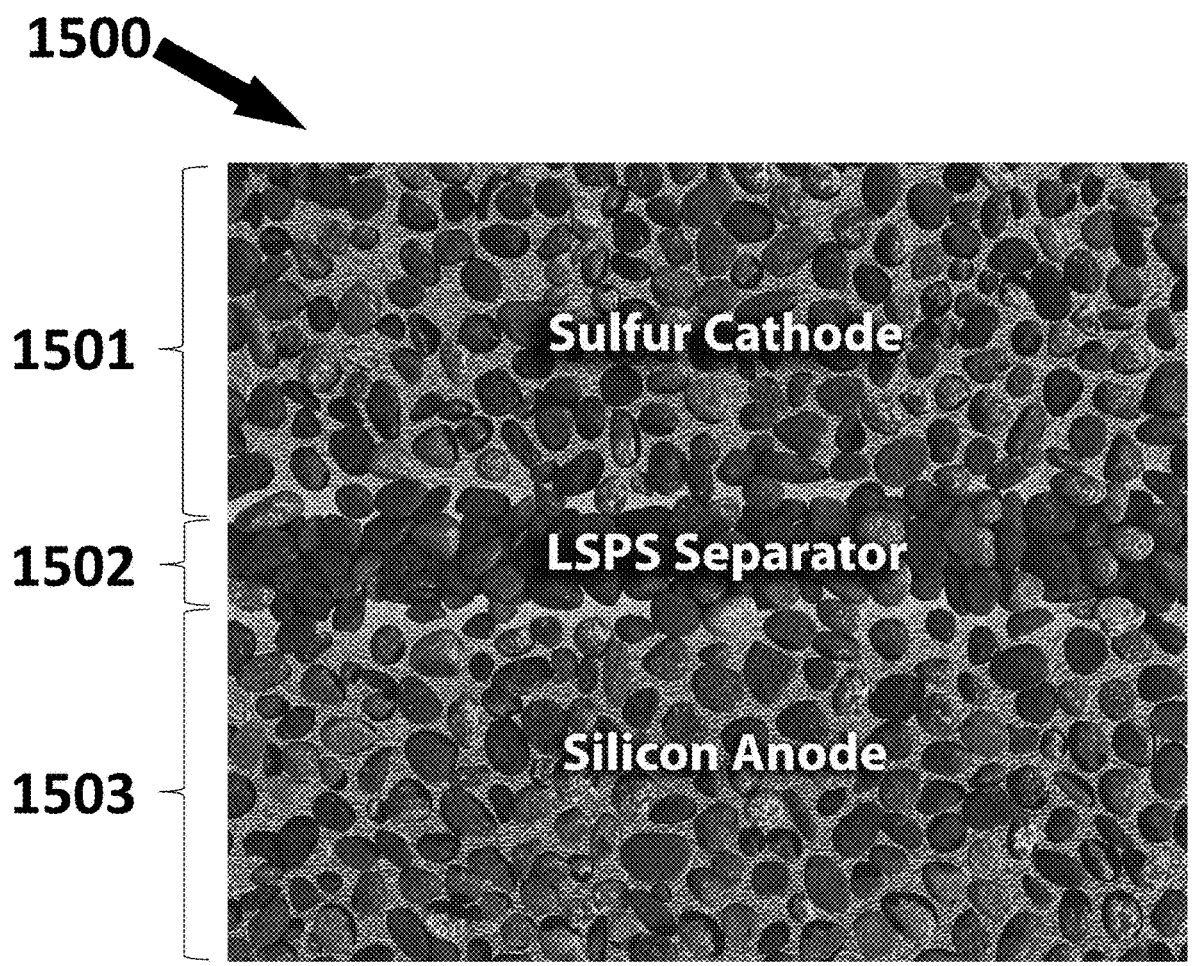
FIG. 15 illustrates an example solid-state battery cell, according to an embodiment.

FIG. 15 illustrates a solid-state battery cell 1500, according to an embodiment. The solid-state battery cell 1500 provides efficient storage of electric potential. The solid-state battery cell 1500 includes a sulfur-based cathode 1501, a separator layer 1502, and a silicon-based anode 1503. The separator layer 1502 can include an LSPS separator or a LiPSCl separator. The silicon-based anode 1503 includes silicon as the constituent component of the anode. In some embodiments, the silicon-based anode 1503 further comprises lithium.

Figure 16:
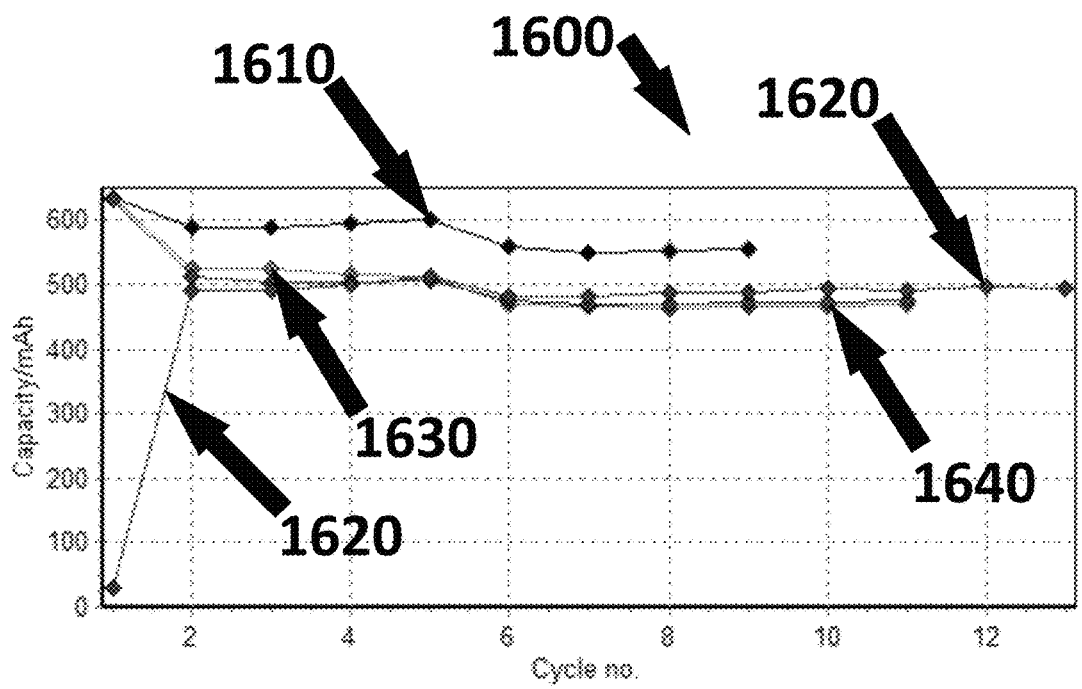
FIG. 16 illustrates the specific capacity of four sulfurized graphene allotrope cathodes, according to an embodiment.

FIG. 16 illustrates the specific capacity of four sulfurized graphene allotrope cathodes in liquid electrolyte for the first 9-13 charge-discharge cycles, according to an embodiment as shown by data sets 1610, 1620, 1630, and 1640 as displayed in table 1600. Four different allotropes of graphene were sulfurized, two versions of platelet graphene allotropes and two versions of short single-walled carbon nanotubes. The cathodes were assembled and tested using liquid electrolyte (a non-solid-state half-cell), the performance of which is well known for benchmarking purposes. Moderately high specific capacities of approximately 500 mAh/g were measured for all four graphene allotropes and good retention was observed for 30+ charge-discharge cycles.

Figure 17:
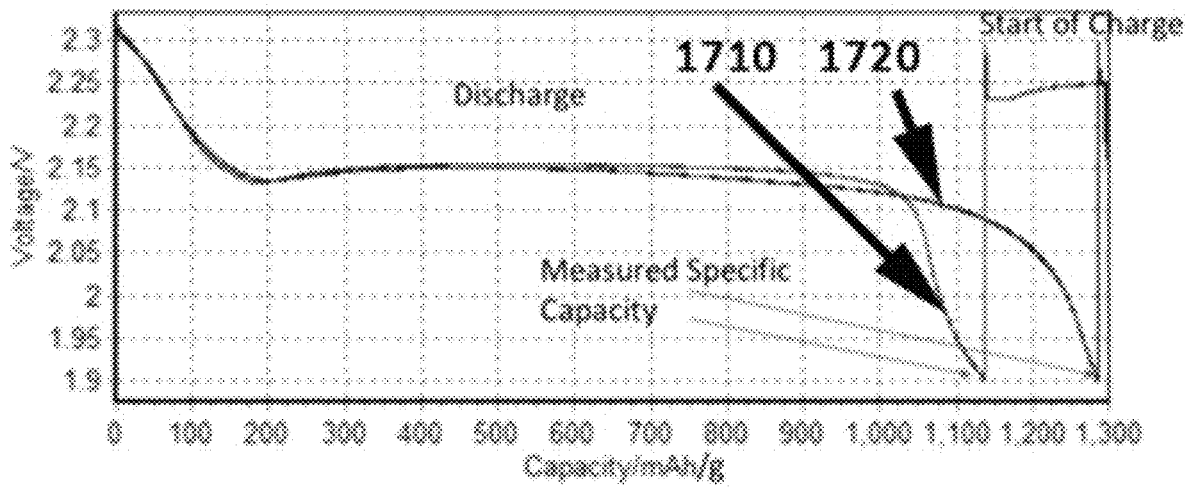
FIG. 17 illustrates a chart of the discharge of two sulfurized cathodes in a liquid electrolyte, according to an embodiment.

FIG. 17 illustrates a chart of the discharge of two sulfurized cathodes in a liquid electrolyte, according to an embodiment. FIG. 17 further illustrates an embodiment including a solid separator prepared from powdered $Li_6PS_5Cl$ with a mean particle size of approximately 200 nm. These half-cells achieved higher specific capacities than the non-solid-state separator embodiments of FIG. 16. The achieved capacitates were between 1100 and 1300 mAh/g, as shown by results 1710 and 1720. These specific capacities outperform lithium-ion half cells on a basic or theoretical analysis. Unfortunately, the embodiments prepared and tested for FIG. 17 could not be tested in subsequent cycles, most likely due to unwanted side reactions between the solid separator and liquid electrolyte. The liquid electrolyte was applied as a compliance layer between the separator and the cathode.

Figure 18:
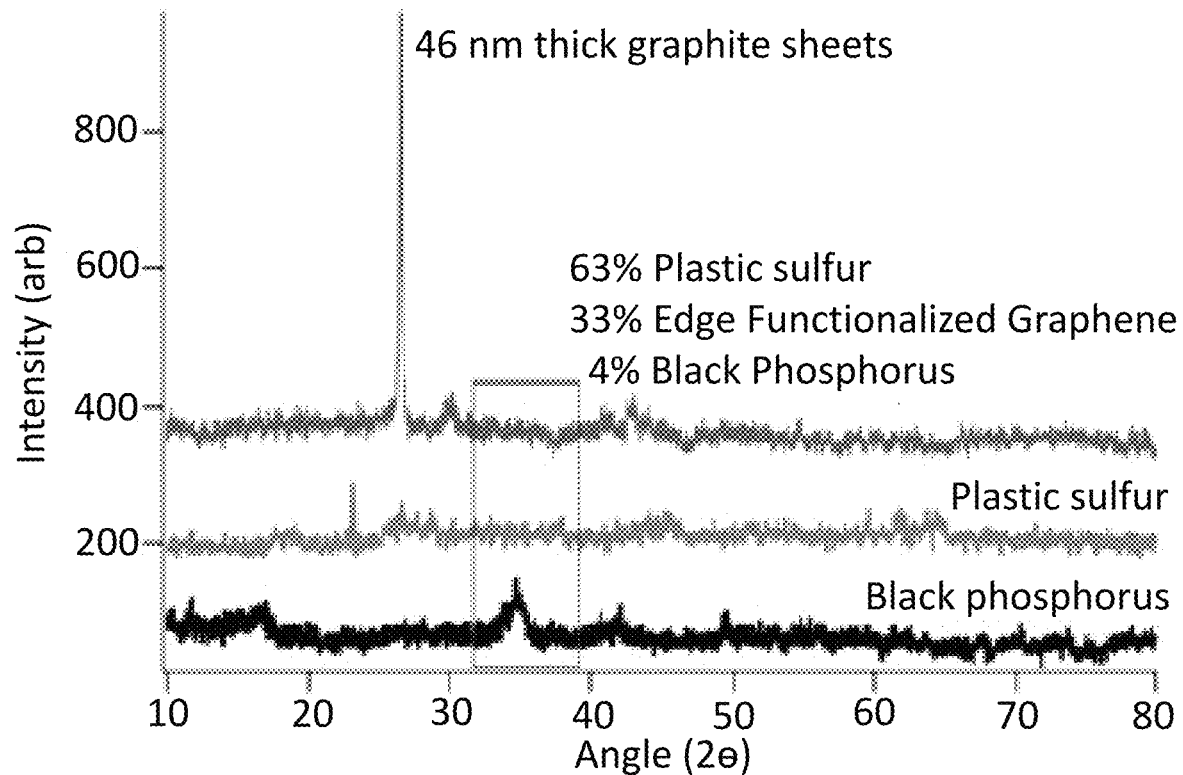
FIG. 18 illustrates an embodiment of a sulfurized and phosphorized graphene cathode, according to an embodiment.

FIG. 18 illustrates an embodiment of a sulfurized and phosphorized graphene cathode, according to an embodiment. More specifically, FIG. 18 is an X-ray diffraction (XRD) analysis of the components of an embodiment of the sulfurized and phosphorized graphene cathode. The embodiment includes 63% sulfur, 33% graphene, and 4% phosphorus. Alternative embodiments can include 30-80% sulfur, preferably 40-70% sulfur, and most preferably 55-65% sulfur. Alternative embodiments can include 10-60% graphene, preferably 20-50% graphene, and most preferably 30-40% graphene. Alternative embodiments can include 0.5-20% phosphorus, preferably 1-10% phosphorus, and most preferably 2-6% phosphorus. The XRD analysis show a peak for the crystalline graphene component, but no peaks for the amorphous sulfur, and a minor peak for the phosphorus.

In an embodiment, the sulfur used is known as plastic sulfur, which is a very soft amorphous structure that allows conformability with the remainder of the cathode structure. Plastic sulfur can be formed by melting followed by rapid cooling to form sulfur with phosphorus used as a conductor and plasticizer. Unreacted plastic sulfur can revert to a crystalline form and become brittle and possibly lose particles unless further reacted.

Figure 19:
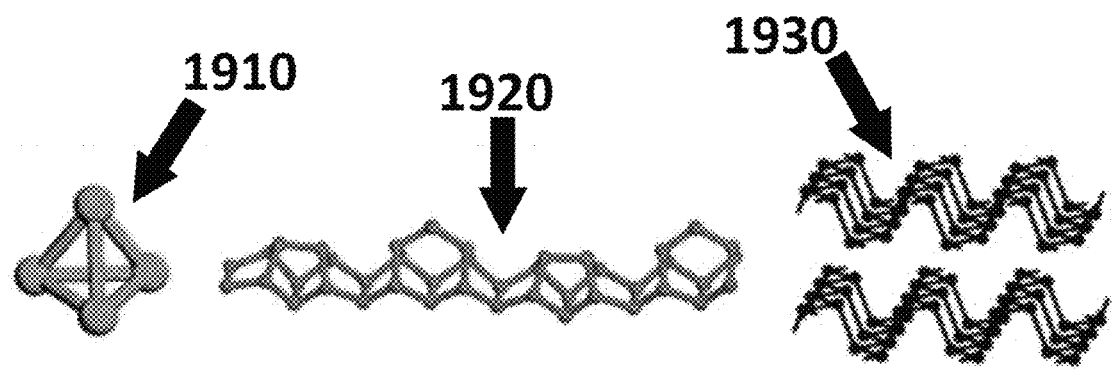
FIG. 19 illustrates alternative phosphorus physical forms, according to an embodiment.

Phosphorus is used to inhibit recrystallization. Embodiments use phosphorus, which is a good electrical conductor, often used in lithium-ion batteries. FIG. 19 illustrates alternative phosphorus physical forms 1910, 1920, and 1930, according to embodiments of the present invention.

The preferred graphene is an edge functionalized graphene (EFGO), which is available in multi-layer formations, for example 2-10 layers or 48-50 layers. The EFGO is a highly conductive material with carboxyl (COOH) and hydroxyl (OH) edge functional groups. The sulfurized graphene cathode material is prepared by melting sulfur in a crucible, at the melting temperature of sulfur, and adding phosphorus to the sulfur to keep the sulfur more flexible.

Next the EFGO, for example a functionalized 48-50 layer graphene, is combined with the sulfur-phosphorus mixture via covalent cross-link bonding of the sulfur to the graphene layers. The sulfur chain imparts strength and added stability to the layers of graphene platelets. Additionally, variations on the amount and type of phosphorus can add alternative features and characteristics to the sulfurized graphene cathode.

The EFGO graphene allows electrons to travel through the highly conductive graphene, and allows the lithium ions to travel in-between the layers of graphene. Preferred embodiments include 300 nm and 400 nm thick cathodes. Increased thickness of the cathode layer can lead to increased energy density. Alternatively, an ion-conductive material homogeneously mixed with the cathode material prior to deposition can provide increased ion conductivity, electron and ion flow, and overall improved performance of the battery. The ion-conductive material can include lithium sulfur phosphorus (LSP), LSPS, or LiPSCl or other similar separator material.

Attempts at preparing sulfur-lithium batteries have run into various challenges. Two known deficiencies are volume expansion and polysulfide shuttle. Volumetric expansion occurs because fully-charged, or ion-rich, sulfur has a significantly greater volume than sulfur in the discharged state, or ion-poor state. The physical volume change causes various instabilities, which can cause problems with recharging and the physical structure of the battery. The second challenge with sulfur-lithium batteries is polysulfide shuttle, which occurs when sulfur atoms or short-chain sulfur molecules break off the long sulfur chains (embodiments include up to 8 sulfur atoms). The sulfur atoms and/or short-chain molecules can cause unwanted side reactions and/or lead to contamination of the battery interfaces. This can limit the recharging or cycling of the battery by clogging or blocking the SEI.

Embodiments have solved the sulfur-lithium battery issues via ball-milling the sulfur particles into nanoparticles. In some embodiments, the nanoparticles may be approximately 10 nm or smaller. Covalently bound nanoparticles of sulfur do not exhibit volumetric expansion or contraction due to the integrity of the bond to the graphene scaffolding material.

Additionally, covalently cross-linking the short chain sulfur molecules to the graphene sheets reduces the existence of free sulfur atoms or molecules. Further, the addition of phosphorus assists with keeping the cathode more flexible, or plastic over time. Mixing of the phosphorus and sulfur prior to bonding with the graphene is preferably done at the melting point of sulfur.

Figure 20:
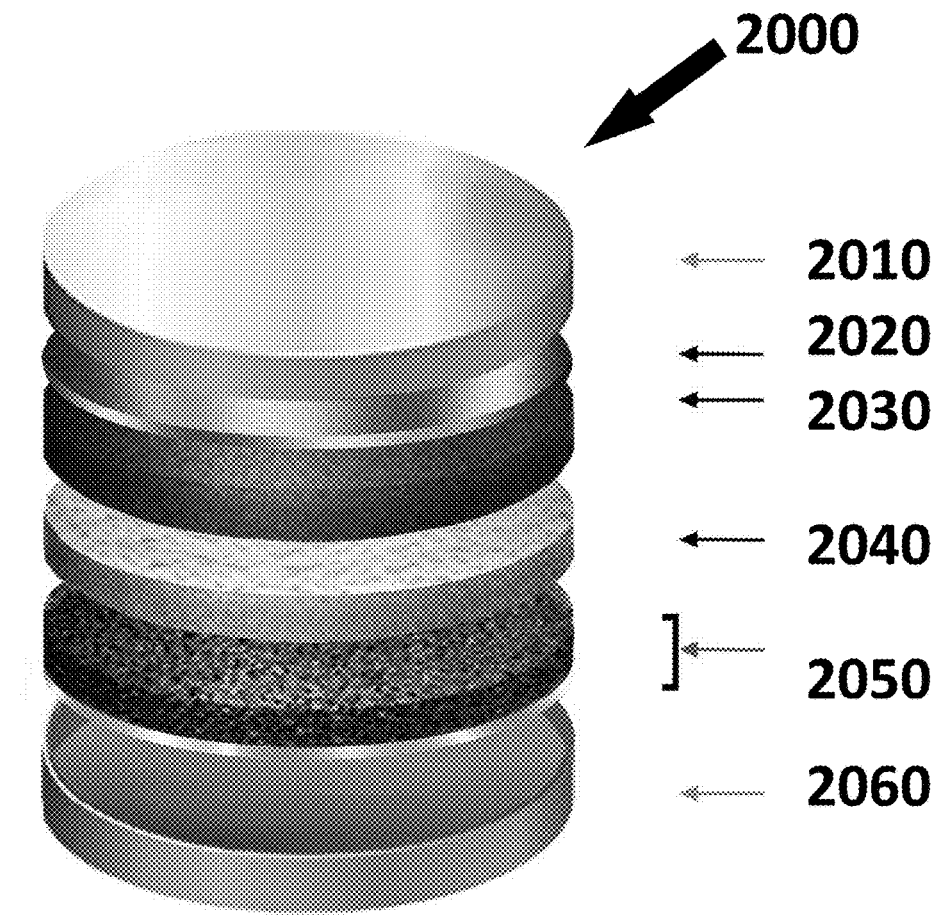
FIG. 20 illustrates a battery assembly, according to an embodiment.

FIG. 20 illustrates a battery 2000, according to an embodiment. The battery 2000 includes first housing 2010, an anode current collector 2020, a lithium metal anode 2030, a separator 2040, a graphene-sulfur cathode 2050, and a second housing 2060. Embodiments include a coin cell casing (a 2032 coin cell casing) as the first housing 2010 and as the second housing 2060. The anode current collector 2020 is preferably 9 μm thick by 15 mm in diameter. The lithium metal anode is 500 μm thick by 15 mm in diameter. The separator 2040 is preferably a Whatman Glass Microfiber 1820 Separator, 200 μm thick by 15 mm in diameter. The graphene/Sulfur Solid Cathode 2050 is 300 μm or 400 μm thick by 15 mm in diameter. Embodiments of the solid lithium-sulfur cathode composites include plastic sulfur, edge-functionalized graphene, and various types of phosphorus to help determine the plasticity over time.

Embodiments of the lithium-sulfur cathode were constructed for testing in the common 2032 coin cell form factor using industry standard materials, including liquid electrolyte for compliance with the test anode.

The lithium-sulfur cathodes were firmly bonded to battery-grade aluminum substrate/current collectors. Bonding of the sulfur cathode to battery-grade aluminum substrate/current collectors can be a done using compact Xenon flash or xenon light. The Xenon flash produces an extremely intense full-spectrum white light for a very short duration. It consists of a glass tube filled with xenon gas which emits a short and very bright flash of white light when a high voltage is applied, and can be used for annealing or heating of the cathode or anode components to the substrate or current collectors.

Alternative embodiments employ annealing the outer surface of the cathode to restrict penetration of the liquid electrolyte.

These cathode/aluminum collector entities were subjected to vacuum for several days to remove any unwanted loose sulfur and volatile compounds. In some implementations, the use of spray deposition may eliminate the need for vacuum treatment. Embodiments with and without a copper anode current collector can be prepared.

Embodiments of the lithium-sulfur cathode were prepared according to the following parameters:

Example 1

54.0%±2.3% Sulfur
2.3%±0.1% Phosphorus
43.6%±0.2% Graphene, 2-5 layers 400 μm thick
Total Weight of the Sulfur:
1a 0.07122±0.00033 g sulfur
1b 0.07122±0.00033 g sulfur
1c 0.07122±0.00033 g sulfur
1d 0.07122±0.00033 g sulfur Example 2

49.5%±2.1% Sulfur
5.0%±0.4% Phosphorus
45.5%±2.3% Graphene, 50 layer
400 um thick
2a. 0.04894±0.0021 g sulfur
2b. 0.04894±0.0021 g sulfur
2c. 0.04894±0.0021 g sulfur
2d 0.04894±0.0021 g sulfur Sample Cathode Testing Protocol The sulfurized graphene cathodes according to Examples 1 and 2 were tested for rate capability and retention capability according to the parameters listed in Table 1.

TABLE 3

| Cathode testing protocols | |
|---|---|
| Cathode Composition | X % of sulfur |
| Separator | Whatman ® glass separator |
| Electrolyte | 1M LiTFSI + 20% LiNO3 in DOL/DME (1:1) |
| Voltage Window | 1.9-2.7 V |
| Rate Capability | C/10, C/5, C/2, 1C and C/10 (5 cycles at each step and 100 cycles at the end |
| Retention Protocol | C/20 for 5 cycles, C/10 for 100 cycles |

Preliminary Cathode Testing Results

Preliminary test results indicate that too much sulfur was used per mass volume. The ideal areal mass loadings of sulfur is approximately 10 mg/cm$^2$ or slightly higher. The thickness of the 400 μm test samples prepared according to Example 1 were reduced to a thickness of the 65-100 μm, and achieved good results.

Figure 21:
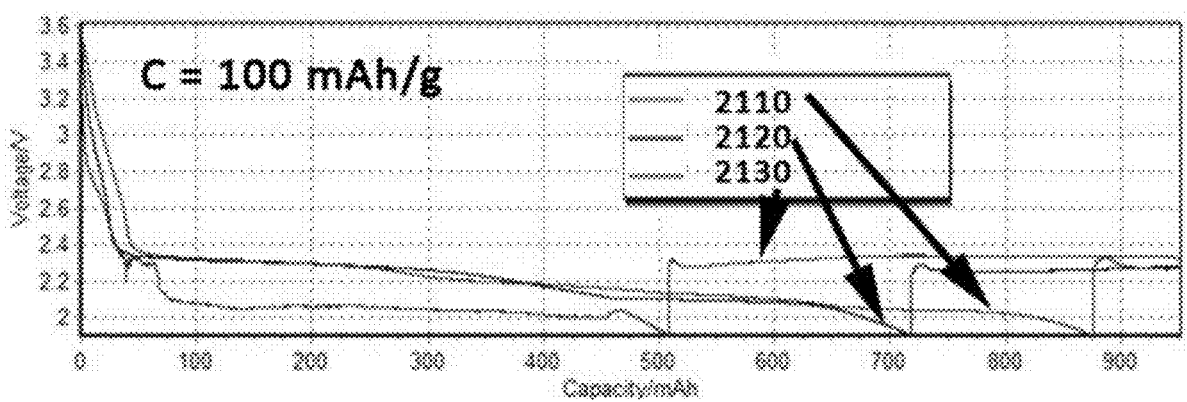
FIG. 21 illustrates test results of the cathodes prepared according to an embodiment.

FIG. 21 illustrates the test results of the samples prepared according to Example 1, according to an embodiment. Specifically, FIG. 21 illustrates the test results of Examples 1c, 1d, and 2d, the 400-μm samples were reduced in thickness. Specific capacities of three samples (2110, 2120, and 2130) characterized are 509, 719, and 877 mAh/g, as shown in the plot in FIG. 21. These capacities are substantially higher values than those obtained from traditional lithium-ion designs that make use of hazardous liquid electrolytes and heavy metals.

Figure 22:
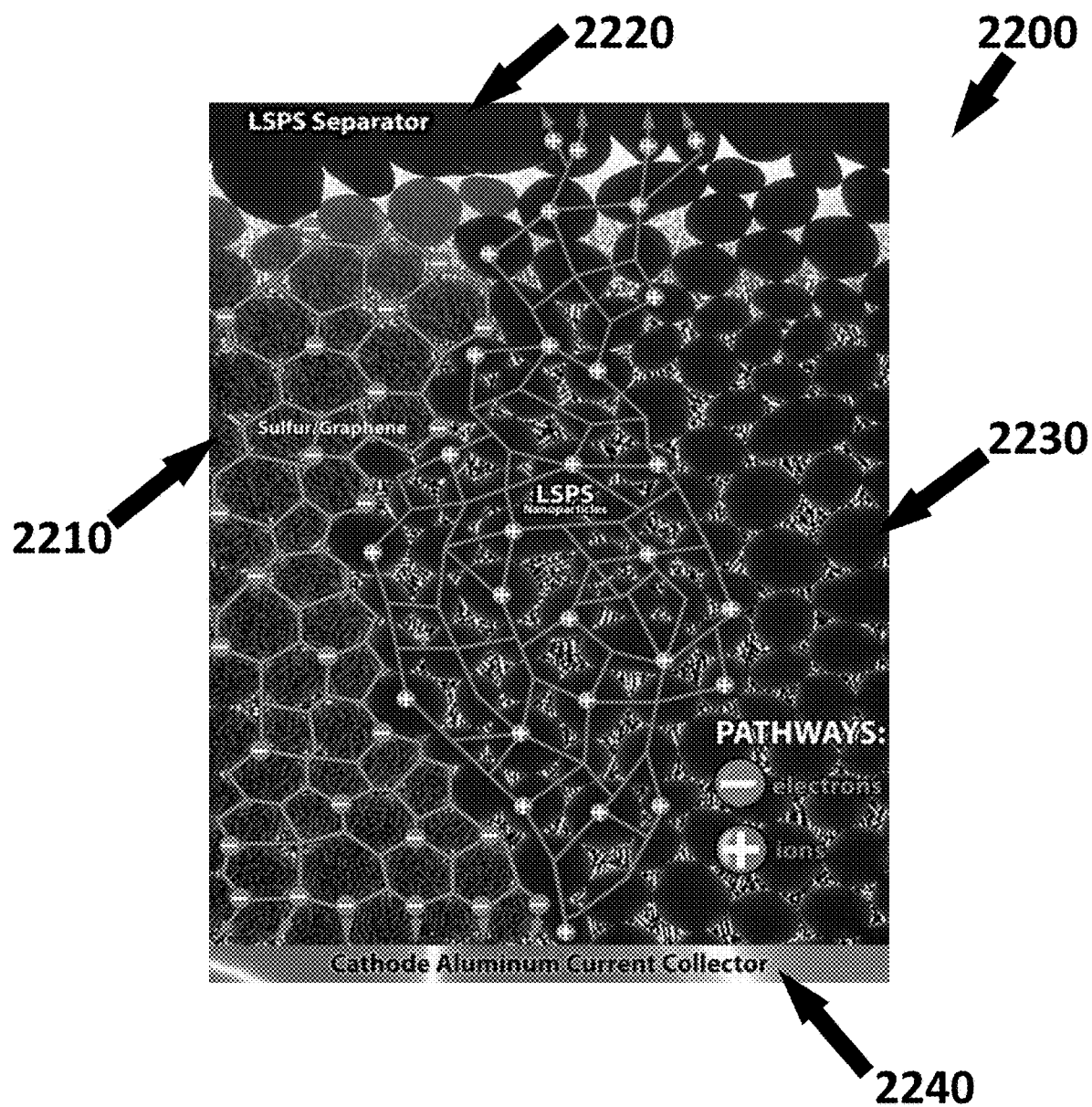
FIG. 22 illustrates a portion of solid-state battery according to an embodiment

FIG. 22 illustrates a portion of a solid-state battery 2200 according to an embodiment. The portion of a solid-state battery illustrated in FIG. 22 has a cathode region 2210, a separator region 2220, and cathode collector 2240. The cathode region 2210 has been supplemented or doped with ion-carrying particles 2230. The ion-carrying particles 2230 can be LSPS or LiPSCl materials, or other ion-conductive materials.

To further improve the characteristics of the solid-state battery, the backbone of the cathode can be prepared with a mix of sulfurized graphene and non-functionalized graphene or graphene without sulfur. The addition of the non-functionalized graphene will reduce the overall sulfur weight percentage of the cathode but higher energy capacity. Greater electrode thickness, in terms of both weight and volume, can provide easier manufacturing processes and a greater energy density. The use of ultrasonic spray deposition to vary the concentrations and ratios of the sulfur/graphene and solid electrolyte/separator particles can be employed to optimize the cathode, separator and/or anode components.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

In some implementations, the electrospray or ultrasonic spray process allows for graduating the ratio of any combination of the three main elements of a solid-state battery, the cathode, separator and anode, which can gradually be blended together to avoid a sharp junction between the various disparate layers as desired. For example, the cathode material can be graduated to include a ratio of less cathode material and more separator material to blend the layers without a sharp delineation between the two elements. This may apply to the separator material blending into the anode, again by graduating the material ratios of the normally two disparate elements to mitigate the delineation between the layers. The separator may gradually blend into one or both of the electrodes as needed for increased ion conduction and for eliminating the SEI.

In some implementations, the electrospray or ultrasonic spray process allows for graduating the ratio of any combination of the three main elements of a solid-state battery, the cathode, separator and anode, which can therefore gradually be blended together to avoid a sharp junction between the various disparate layers as desired. That also means that the separator material, possibly an argyrodite such as LiPSCl or a similar solid ion conductor, can be blended throughout the cathode and/or anode all the way to the current collectors to provide continuity and reliably fast ion conduction throughout one or both of the electrodes. This allows for thick electrode(s) that would have greater energy density in both weight and volume than current thin-film batteries and vastly simplify the manufacturing process.

In some implementations, the electrospray or ultrasonic spray process allows for graduating the ratio of any combination of the three main elements of a solid-state battery, the cathode, separator and anode, which can therefore gradually be blended together to avoid a sharp junction between the various disparate layers as desired. A novel variation of this unique process would allow the electrodes to be blended into their respective electrodes: the cathode may gradually be blended into the aluminum via a varying ratio of cathode material and aluminum nanoparticles, or similar. This would provide extremely fast electron conduction with far greater surface area than traditional batteries from electrode to current collector.

In some implementations, the anode may gradually be blended into the copper current collector via a varying ratio of anode material and copper nanoparticles, or similar. This would provide extremely fast electron conduction with far greater surface area than traditional batteries from electrode to current collector.

In some implementations, the electrospray or ultrasonic spray process allows for spray deposition of a battery in situ to construct shapes specifically designed for a true "structural" or "massless" battery integrated into the device parts, examples include the rear plate of a smart phone, the case of a smart watch, or the back of a dashboard to conserve weight and minimize connecting wires. The shape can be designed into the device and does not necessarily need to be flat; the manufacturing process consists of coating a curved surface.

In some implementations, the electrospray or ultrasonic spray process allows for spray deposition of a battery in a roll-to-roll method of spraying the active nano and microparticles onto a substrate such as the current collector, and as the build goes to the next chamber it receives another spray-deposited layer, precisely controlled in terms of the ratio of materials, onto the next elements of the battery in a gradual and blended fashion, and so on until the battery is at the end of the assembly line. The exacting computer control of the spray deposition processes, the simplicity of each step and process, and the ability to use powerful and environmentally-friendly materials yield decreased cost, better battery performance, unique shapes, and flexibility to provide customized batteries for exact purposes. The process is scalable to accommodate batteries for earbuds or main battle tanks as required.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

What is claimed is:

1. A device comprising:
   a cathode comprising:
      graphene;
      sulfur; and
      phosphorus, wherein:
         the graphene comprises between 2 and 50 layers of graphene sheets;
         the sulfur is covalently bonded to the graphene; and
         the phosphorus is bonded to the sulfur;
   an anode comprising silicon and lithium;
   a separator comprising an ion-conductive material and a binder, wherein:
      the ion-conductive material is a lithium sulfur phosphate $Li_6PS_5Cl$, or other argyrodite; and
      the separator is located between the anode and the cathode;
   a first current collector and a second current collector, wherein:
      the first current collector is copper and affixed to the anode; and
      the second current collector is aluminum and affixed to the cathode; and
   a first housing and a second housing, wherein:
      the first housing is affixed to the anode, and the second housing is affixed to the cathode; and
      the device is a solid-state battery comprising one of no liquid electrolyte and a liquid electrolyte.

2. The device of claim 1, wherein:
   the graphene is 10-60% of the cathode by weight;
   the sulfur is 30-80% of the cathode by weight;
   the phosphorus is 1-10% of the cathode by weight; and
   the graphene is an edge functionalized graphene comprising 2-50 sheets of graphene.

3. The device of claim 2, wherein:
   the edge functionalized graphene comprises edge functionalized graphene that is covalently bonded to sulfur and edge functionalized graphene without sulfur.

4. The device of claim 1, wherein:
   the separator has a thickness between 1 to 50 μm;
   the cathode has a thickness between 65 and 400 μm; and
   the sulfur comprises chains from $SLi_2$ to $S_8Li_6$ covalently bonded to the graphene.

5. The device of claim 1, wherein:
   the cathode further comprises an ion-conductive material dispersed in the cathode;
   the ion-conductive material is lithium tin phosphorus sulfide or lithium phosphorus sulfur chloride; and
   the ion-conductive material is configured to increase electron and ion flow within the cathode.

6. The device of claim 1 wherein the sulfur is $S_2$-$S_8$ milled to a uniform sub-micron particle size and cross-links the graphene sheets.

* * * * *